United States Patent [19]
Nishida et al.

[11] Patent Number: 5,871,881
[45] Date of Patent: Feb. 16, 1999

[54] MULTILAYER OPTICAL INFORMATION MEDIUM

[75] Inventors: Tetsuya Nishida, Tokyo; Yumiko Anzai, Tachikawa; Kenchi Ito, Kokubunji; Yoshito Tsunoda, Tokyo; Masahiko Takahashi, Uenohara-machi; Hisae Sasaki, Tokyo; Kazuhiko Nakano, Kawasaki, all of Japan

[73] Assignees: Hitachi, Ltd.; Nippon Columbia Co., Ltd., both of Tokyo, Japan

[21] Appl. No.: 638,847

[22] Filed: Apr. 29, 1996

[30] Foreign Application Priority Data

Apr. 27, 1995 [JP] Japan .................................. 7-103580
Aug. 24, 1995 [JP] Japan .................................. 7-215676
Sep. 19, 1995 [JP] Japan .................................. 7-239514

[51] Int. Cl.$^6$ ................................................ G11B 7/24
[52] U.S. Cl. .............................. 430/270.11; 430/270.12; 430/270.13; 430/945; 369/284; 369/288; 428/64.3; 428/64.4
[58] Field of Search ................ 430/270.11, 270.12, 430/270.13, 945; 369/283, 284, 288; 428/64.3, 64.4

[56] References Cited

U.S. PATENT DOCUMENTS

| 4,450,553 | 5/1984 | Holster et al. ................ 369/275 |
| 5,134,604 | 7/1992 | Nagashima et al. ............ 369/94 |
| 5,373,499 | 12/1994 | Imaino et al. ............... 369/275.4 |
| 5,598,398 | 1/1997 | Best et al. ................... 369/272 |
| 5,625,609 | 4/1997 | Latta et al. ................... 369/44.23 |

FOREIGN PATENT DOCUMENTS

| 0447236 | 9/1991 | European Pat. Off. . |
| 4-205934 | 7/1992 | Japan . |

OTHER PUBLICATIONS

"Compact Disc Reader", Nakajima et al, Published by Ohm, Nov. 1982.
Abstract of JP 59–127237, Yamanaka (Jul. 1984).
Abstract of JP 60–202545, Oikawa et al. (Oct. 1985).

*Primary Examiner*—John A. McPherson
*Attorney, Agent, or Firm*—Antonelli, Terry, Stout & Kraus, LLP

[57] ABSTRACT

A multilayer optical information medium provided with structure in which first and second substrates respectively provided with two to four layers of planar information areas are respectively arranged outside wherein the thickness of the above-described first and second substrates is set in the range of 0.52 to 0.65 mm. The above-described planar information area consists of embossed pits provided, for example on the surface of respective substrates or on the surface of a layer formed by transparent material and a semi-reflective layer provided on the embossed pits. A planar information area arranged in the farthest position from respective substrates is provided with a reflective layer in place of the above-described semi-reflective layer. The planar information area arranged in the farthest position from respective substrates may be constituted by a recording layer and a reflective layer provided on the recording layer.

69 Claims, 7 Drawing Sheets

MULTILAYER OPTICAL INFORMATION MEDIUM

BACKGROUND OF THE INVENTION

The present invention relates to an optical information medium such as an optical disk, an optical tape and an optical card. This optical information medium also includes a read only type optical disk such as a compact disc (CD), a laser disc (LD) and a digital video disc (DVD) and a write once type or an erasable type optical disk for a computer.

Heretofore, a method of densifying an optical information medium is equal to that of densifying a two-dimensional information medium. However, as the size of an information medium is limited for miniaturization of an apparatus and further, densification on a plane is limited because the size of a recordable mark is also limited due to a diffraction limit of light.

As a method of further densification, a method for reading out a three-dimensional record including depth is discussed. For example, Japanese published unexamined patent application No. Sho 59-127237 discloses a method of recording and reading out by focusing a beam on each recording layer in a disk provided with a multilayer recording layer. However, in an embodiment thereof, the concrete structure of an information medium is not shown and therefore, reliable recording according to the invention cannot be expected.

For example, Japanese patent Laid-Open No. Sho 60-202545 discloses the thickness of an information medium for forming a light spot at a diffraction limit in each layer of a disk provided with a multilayer recording layer. However, in an embodiment thereof, the structure of an information medium which can be fabricated at a low cost is also not shown clearly.

For example, Japanese patent Laid-Open No. Sho 54-130902 discloses a disk provided with a multilayer information layer. However, a signal to noise ratio (S/N) cannot be increased in this disk and planar recording density of each information layer cannot be also enhanced.

In an optical information medium, a reflective layer of a light beam is required to be provided to detect light reflected from the same face as an incident one of a light spot for recording and reading out. It is known formerly that metal with high reflectance such as aluminum and gold as metal used for such a reflective layer should be used and it is disclosed in for example on pages 12 and 84 of "Compact disc reader" written by Mr. Nakajima and Mr. Ogawa published on Nov. 25 in 1982 by Ohm.

Aluminum or an aluminum alloy is suitable of metals used for this reflective layer because its cost is low. However, if a conventional single thin film formed by aluminum or an aluminum alloy is used for a reflective layer, linear data density cannot be higher than some extent because noise is increased and S/N is not large enough and an optical information medium with large capacity cannot be provided. To enhance recording density of each layer two-dimensionally, an information reader which can irradiate a light spot for reading out with a shorter wavelength is used. However, a problem caused when an information medium with multilayer structure is applied to such an information reader is discussed in no conventional embodiment.

A first object of the present invention is to provide a multilayer optical information medium with planar high recording density wherein reading out of a three-dimensional record is enabled and which can be fabricated at a low cost.

A second object of the present invention is to provide a low-priced optical information medium or a low-priced multilayer optical information medium provided with a reflective layer which can enhance S/N and its linear data density sufficiently.

A third object of the present invention is to provide a multilayer optical information medium wherein the intensity of a read out signal is not deteriorated even if an information reader for a high recording density medium with a shorter wavelength of a light spot for reading out is used.

SUMMARY OF THE INVENTION

The above-described first object is achieved by a multilayer optical information medium comprising a first optical information medium provided with two to four layers of planar information areas on a first substrate, a second optical information medium provided with two to four layers of planar information areas on a second substrate and structure in which the above-described first and second substrates are respectively arranged outside wherein the thickness of the first and second substrates is respectively between 0.52 mm and 0.65 mm.

Its focused spot area can be reduced and the above-described medium can be densified because the allowable inclination of an optical disk can be approximately equal to that of a conventional optical disk by setting the thickness of a substrate in the above-described range even if a semiconductor laser with a short wavelength of 700 nm or less is used and an objective lens with a large numerical aperture of 0.6 or more is used.

It is desirable that in a multilayer optical information medium according to the present invention, the thickness of a substrate is set between 0.52 mm and 0.65 mm if two layers of planar information areas are provided on the substrate, the thickness of a substrate is set between 0.52 mm and 0.62 mm if three layers of planar information areas are provided on the substrate and the thickness of a substrate is set between 0.52 mm and 0.59 mm if four layers of planar information areas are provided on the substrate.

A planar information area arranged in the closest position to each substrate of planar information areas in a multilayer optical information medium according to the present invention can be constituted by embossed pits provided on the surface of respective substrates and a semi-reflective layer provided on these embossed pits.

At least one of planar information areas can be constituted by embossed pits provided on the surface of a layer formed by material which transmits a light spot for reading out information provided on each substrate and a semi-reflective film provided on the embossed pits.

A planar information area respectively arranged in the farthest position from respective substrates of planar information areas provided on each optical information medium may be a read only type and may be recordable. In the case of the former, such a planar information area can be constituted by embossed pits provided on a layer formed by material which transmits a light beam and a semi-reflective layer provided on the embossed pits. In the case of the latter, such a planar information area can be constituted by a recording layer and a reflective layer provided thereon. Planar information areas other than such ones are a read only type.

That is, all planar information areas in a multilayer optical information medium according to the present invention may be a read only type, and only the planar information area arranged in the farthest position from a substrate of planar information areas on each substrate may be recordable and other planar information areas may be a read only type. In the case of the former, only the planar information area arranged in the farthest position from a substrate is provided with a reflective layer, while other planar information areas are provided with a semi-reflective layer. In the case of the latter, only the recordable planar information area is provided with a reflective layer, while other planar information areas are provided with a semi-reflective layer.

A signal can be read out without cross talk between planar information areas controlling increase of noise due to aberration by setting the thickness of the above-described layer formed by transparent material in the range of 30 to 80 $\mu$m, preferably by setting it in the range of 30 to 60 $\mu$m and by setting the thickness of a substrate in the above-described range depending upon the number of planar information areas provided on the substrate.

It is desirable that the reflectance measured by focusing on a semi-reflective film or a reflective film constituting each planar information area provided on a substrate from the side of the substrate is in the range of 10 to 50%. It is desirable that the difference between respective values of the reflectance is in the range of 20%, that is, in the range of ±10%. According to above description, servo control can be applied stably without adjustment if a signal is read out from any planar information area.

It is desirable that the above-described semi-reflective layer is formed by dielectrics or metal and the above-described reflective layer is formed by metal. In this case, dielectrics shall be at least one of silicon, silicon nitride, silicon oxide, germanium, germanium oxide, germanium nitride, zinc sulfide and aluminum nitride and metal shall be at least one of aluminum, an aluminum alloy, gold, a gold alloy, silver, a silver alloy, copper and a copper alloy.

When a multilayer optical information medium is formed by integrating first and second optical information mediums, they can be stuck by an adhesive. For an adhesive, a hot melt adhesive may be used. They can be also stuck in vacuum using ultraviolet cured resin or a reactive adhesive lest bubbles enter an adhesive layer. The mechanical characteristics of an optical information medium are enhanced greatly by sticking so that no bubbles enter an adhesive layer. If ultraviolet cured resin is used, single optical information mediums can be stuck without forming a protective film such as an ultraviolet cured resin layer beforehand. For a reactive adhesive, an epoxy adhesive or a silicone adhesive may be used.

The above-described second object can be achieved by an optical information medium at least provided with a reflective layer for reflecting a light spot for reading out wherein the reflective layer is provided with an area in which the density of at least one of oxygen and nitrogen is high in the direction of the thickness thereof or an optical information medium at least provided with a reflective layer for reflecting a light spot for reading out wherein the reflective layer consists of at least two metallic layers and provided with an intermediate layer formed by a compound consisting of at least one of a nitride and an oxide between each metallic layer.

For a reflective layer in the former or a metallic layer in the latter, it is desirable that aluminum or an aluminum alloy is used. A reflective layer can be fabricated at a low cost by using aluminum or an aluminum alloy. It is desirable that an aluminum alloy the average composition of which is shown in a general expression $(Al)_{100-x}(A)_x$ (x: atomic percentage in the range of $0.1 \leq x \leq 30$, A: at least one element of Si, Sc, Ti, V, Cr, Mn, Fe, Co, Ni, Zn, Ga, Ge, Y, Zr, Nb, Mo, Ru, Rh, Pd, Cd, In, Sn, Sb, Te, La, Hf, Ta, W, Re, Os, Ir, Pt, Tl, Pb, Bi, Au, Ag and Cu) is used. "x" denotes an atomic percentage, it is preferable that it is in the range of $0.5 \leq x \leq 15$ and it is most preferable that it is in the range of $1 \leq x \leq 10$. It is desirable that an element denoted by "A" is Ti, Zr or Hf to reduce noise.

It is desirable that the thickness of a reflective layer is in the range of 20 to 500 nm. If the thickness of a reflective layer is 20 nm or more, the reflective layer can function sufficiently and if the thickness of a reflective layer is 500 nm or less, the resistance to environment and the recording sensitivity of an erasable type optical information medium are satisfactory.

An area in which the density of at least one of oxygen and nitrogen in a reflective layer is high has only to be provided in one or more locations in the direction of the thickness thereof. It is desirable that an area is provided in one or two locations because the manufacturing process is complicated when it is provided in many locations.

One or more intermediate layers formed by a compound consisting of at least one of a nitride and an oxide in a reflective layer has/have only to be provided, however, it is desirable that one or two intermediate layers is/are provided because the manufacturing process is complicated when many intermediate layers are provided.

A method of forming a reflective layer may be any of radio frequency sputtering, direct current sputtering, magnetron sputtering, vacuum evaporation, electron beam evaporation, ion beam evaporation and ion plating.

A reflective layer can be formed by applying oxygen or nitrogen gas or both while a reflective layer is being formed, by continuing deposition after exposure to the air while a reflective layer is being formed or by sputtering or evaporating a compound consisting of at least one of a nitride and an oxide of desired metal while a reflective layer is being formed.

Such a reflective layer can be applied to a planar information area arranged in the farthest position from a substrate provided with two to four layers of planar information areas described above. A multilayer optical information medium can be fabricated by integrating such two substrates so that they are respectively arranged outside.

The above-described third object is achieved by a multilayer optical information medium wherein first and second planar information areas for reading out information by a focused light beam are arranged between first and second substrates arranged opposite each other, the above-described first planar information area arranged on the side of the above-described first substrate on which the above-described light beam is incident is constituted by embossed pits provided on the surface of the first substrate and a semi-reflective layer provided thereon, the above-described second planar information area arranged on the side of the above-described second substrate is constituted by embossed pits provided on the surface of a layer formed by material which transmits the above-described light beam and a reflective layer provided thereon, the thickness of the first substrate is between 0.52 mm and 0.65 mm, the above-described semi-reflective layer consists of at least three dielectric layers and two dielectric layers which are in contact each other are different in optical constants.

The optical constants denote n (refractive index) and k (extinction coefficient) in a complex refractive index ($n^* = n - i \cdot k$) The optical constants of a dielectric layer can be changed by changing its composition, by changing the ratio of its composition or by changing its crystal structure.

The above-described first planar information area of this multilayer optical information medium may be constituted by an erasable recording layer and a reflective layer provided on the side reverse to the side on which a light beam is incident of the recording layer.

It is desirable that the distance between the surface of the first substrate on the side reverse to the second substrate and the surface of a reflective layer on the side of the first substrate is in the range of 0.57 to 0.66 mm in this multilayer optical information medium. It is desirable that the thickness of a layer formed by transparent material is in the range of 30 to 80 μm and it is preferable that it is in the range of 30 to 60 μm. Information can be read out controlling increase of noise because cross talk between planar information areas can be reduced and the aberration of a focused laser beam can be also reduced hereby.

It is desirable that the above-described semi-reflective layer is formed by at least one of Si, an oxide of Ce, La, Si, In, Al, Ge, Pb, Sn, Ta, Sc, Y, Ti, Zr, V, Nb, Cr and W, a sulfide of Zn, Ga, In, Sb, Ge, Sn and Pb, a fluoride of Mg, Ce and Ca and a nitride of Si, Al, Ta and B.

For a sulfide, zinc sulfide for these dielectrics is preferable because its refractive index is suitable and a layer formed by it is stable. For a nitride, silicon nitride, aluminum nitride and tantalum nitride are preferable because their refractive index is suitable and a layer formed by them is solid. For an oxide, silicon oxide, aluminum oxide, tantalum oxide, germanium oxide, scandium oxide, titanium oxide, yttrium oxide, zirconium oxide, cerium oxide, indium oxide and tin oxide are preferable. For a compound, a compound of zinc sulfide and silicon oxide is preferable because its extinction coefficient is approximately zero and it absorbs no light even if a beam with a short wavelength of 400 nm or less is used, and its refractive index can be freely set in a wide range.

It is desirable that the reflectance measured from the side of the first substrate of the above-described semi-reflective layer and reflective layer is respectively in the range of 20 to 50% and the difference between respective value of the reflectance is in the range of 10%.

The above-described third object is achieved by a multilayer optical information medium comprising a first optical information medium provided with two to four layers of planar information areas on a first substrate, a second optical information medium provided with two to four layers of planar information areas on a second substrate and structure in which the above-described first and second substrates are respectively arranged outside wherein the thickness of the first and second substrates is respectively between 0.52 mm and 0.65 mm, planar information areas other than planar information areas arranged in the farthest position from respective substrates of the above-described planar information areas on the first and second substrates are provided with a semi-reflective layer, the reflective layer consists of at least three dielectric layers and two dielectric layers which are in contact each other are different in optical constants.

The above-described planar information area is constituted by the above-described semi-reflective layer and embossed pits provided on respective substrates. The above-described planar information area is constituted by the above-described semi-reflective layer and embossed pits provided on a layer formed by material which transmits a light beam.

It is desirable that the thickness of the layer formed by transparent material is in the range of 30 to 80 μm and it is preferable that it is in the range of 30 to 60 μm. It is desirable that the distance between the surface of the first substrate on the side reverse to the second substrate and the surface of a reflective layer provided on the first substrate on the side of the first substrate is in the range of 0.57 to 0.66 mm. The case of the second substrate is also similar. Information can be read out controlling increase of noise because cross talk between planar information areas is reduced and the aberration of a focused laser beam is also reduced hereby.

It is desirable that the reflectance measured from the side of respective substrates of the above-described semi-reflective layer and reflective layer provided on each substrate is respectively in the range of 10 to 50%. In the range, servo control can be applied to any planar information area stably, however, if the reflectance exceeds 50%, a gain control is required to be switched because a state caused by such high reflectance is beyond the range of an automatic gain control for servo control. It is desirable that the reflectance is in the range of 20 to 40% because servo control can be applied to any planar information area stably without switching an automatic gain control.

It is desirable that the difference between respective values of the reflectance of a semi-reflective layer and a reflective layer is in the range of 10%. Thereby, servo control can be applied without adjustment stably in focus jump even if a signal is read out from any planar information area.

The suitable material for such a semi-reflective layer is the same as that for the above-described semi-reflective layer.

DETAILED DESCRIPTION OF PREFERRED EMBODIMENTS

Referring to embodiments, the present invention will be described in detail below.

(First Embodiment)

Figure 1:
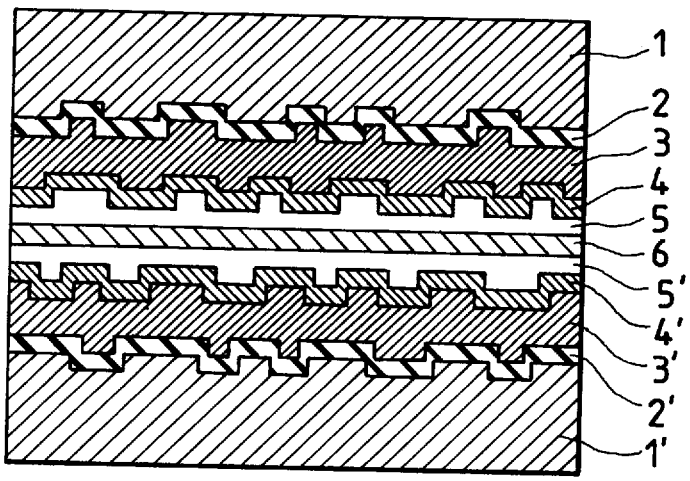
FIG. 1 is a sectional view showing a multilayer optical information medium equivalent to a first embodiment according to the present invention.

FIG. 1 is an enlarged view showing the section of a multilayer optical information medium equivalent to a first embodiment according to the present invention. A substrate 1 wherein information is formed as optical embossed pits on the surface of a disk-shaped polycarbonate plate 120 mm in diameter and 0.58 mm thick by injection molding is fabricated. Silicon is sputtered on the above-described substrate 1 using gas made by mixing nitrogen equivalent to 5% with argon by a radio-frequency magnetron sputtering device and a semi-reflective layer 55 nm thick 2 consisting of a mixture of silicon and silicon nitride with optical constants of 3.00 to 0.12 i is formed so as to constitute a first read only type planar information area.

Next, using ultraviolet cured resin, an ultraviolet cured resin layer 40 μm thick 3 wherein information is formed as optical embossed pits by photo polymerization for transferring information through a stamper is formed. In this case, ultraviolet rays are irradiated through a stamper which is a transparent mold made of plastic from the side of the mold. Thereon, a reflective layer 50 nm thick 4 consisting of gold is formed by sputtering using argon gas to constitute a second read only type planar information area. Further, after an ultraviolet cured resin layer 10 μm thick is formed by coating ultraviolet cured resin spinning, ultraviolet rays are irradiated so that the above-described layer is cured and a protective layer 5 is formed so as to fabricate an optical information medium A.

Similarly, a semi-reflective layer 2' consisting of a mixture of silicon and silicon nitride is formed on a substrate 1' on the surface of which optical embossed pits is formed so as to constitute a third read only type planar information area, further a fourth read only type planar information area is formed by an ultraviolet cured resin layer 3' with optical embossed pits on the surface and a reflective layer 4' consisting of gold and further, a protective layer 5' consisting of ultraviolet cured resin is formed to fabricate another optical information medium B. The first to fourth read only type planar information areas are respectively provided with different information.

The optical information mediums A and B fabricated as described above are stuck together by an adhesive layer 6 so that the substrates 1 and 1' are set outside so as to fabricate a multilayer optical information medium C. In this case, after a silicone reactive adhesive is deposited on the protective layer 5 of the optical information medium A by 50 μm spinning the silicone reactive adhesive, the optical information medium B is stuck on the optical information medium A in a vacuum so that no bubble enters between the optical information mediums.

Data is read out from the multilayer optical information medium C fabricated as described above by an optical disk drive (semiconductor laser beam wavelength: 635 nm, numerical aperture (NA) of objective lens: 0.6) and the read out data is evaluated. The disk is rotated at fixed linear or angular velocity and a continuous beam from a semiconductor laser is focused on each planar information area in an arbitrary radius thereof through the substrate 1 or 1' with an objective lens in an optical head. If the optical information medium A is read out, a continuous beam is focused on the first or second read only type planar information area. If the optical information medium B is read out, a continuous beam is automatically focused on the reflective face of the third or fourth read only type planar information area by tracking and data is read out by detecting the intensity of reflected light.

When the above-described multilayer optical information medium C is rotated at linear velocity of 3.3 m/sec., data consisting of embossed pits (pit depth: 80 nm mark length: 0.45 μm, mark pitch: 0.9 μm, track pitch: 0.74 μm) is read out at the level of light for reading out of 0.5 mW on the surface of the medium and a read out signal with a carrier to noise ratio (C/N) of 53.0 dB in resolution band width of 30 kHz and a signal to noise ratio (S/N) of 25.0 dB in a frequency band of 9 MHz is outputted even if any of the first to fourth read only type planar information areas is read out. Cross talk between faces at this time from an adjacent planar information area is −40.5 dB.

The reflectance of the semi-reflective layer 2 or 2' consisting of a mixture of silicon and silicon nitride and the reflective layer 4 or 4' consisting of gold viewed from the side of the substrate 1 or 1' of the optical information medium A or B in the multilayer optical information medium C is measured with the above-described optical head and the reflectance is respectively 30%.

If the thickness of the substrate 1 of the above-described multilayer optical information medium C is changed, the signal to noise ratio (S/N) of the first and second read only type planar information areas is varied as shown in Table 1:

TABLE 1

| Thickness of substrate 1 (mm) | First read only type planar information area (dB) | Second read only type planar information area (dB) |
| --- | --- | --- |
| 0.51 | 23.5 | 24.5 |
| 0.52 | 24.0 | 24.7 |
| 0.54 | 24.3 | 25.0 |
| 0.56 | 24.7 | 25.2 |
| 0.58 | 25.0 | 25.0 |
| 0.60 | 25.2 | 24.7 |
| 0.62 | 25.0 | 24.3 |
| 0.64 | 24.7 | 24.0 |
| 0.65 | 24.5 | 23.5 |

If the substrate 1 is thinner than 0.52 mm or thicker than 0.64 mm, the signal to noise ratio (S/N) is smaller than 24 dB which is the lowest level at which data can be read out without an error because of increase of noise due to spherical aberration.

Even if a substrate is thinned from the conventional 1.2 mm to approximately a half as described above and for densification, a beam with a short wavelength of 635 nm from a semiconductor laser and an objective lens with a large numerical aperture of 0.6 are used, the allowable tilt angle of an optical disk of 9 mrad equivalent to the conventional one can be obtained and a low-priced optical system as the conventional compact disc (wavelength: 780 nm, NA: 0.45) can be used.

Further, if the thickness of the substrate 1' of the above-described multilayer optical information medium C is changed, the signal to noise ratio (S/N) of the third and fourth read only type planar information areas is respectively varied as the first and second read only type planar information areas shown in Table 1.

If the thickness of the ultraviolet cured resin layer 3 of the above-described multilayer optical information medium C is changed, the signal to noise ratio (S/N) of the second read only type planar information area and cross talk between faces of a read out signal from the first read only type planar information area in the second read only type planar information area are as follows:

TABLE 2

| Thickness of ultraviolet cured resin layer 3 ($\mu$m) | S/N (dB) of second read only type planar information area (dB) | Cross talk between faces (dB) |
| --- | --- | --- |
| 25 | 25.0 | −26 |
| 30 | 25.1 | −30 |
| 35 | 25.1 | −35 |
| 40 | 25.0 | −40 |
| 50 | 24.9 | −46 |
| 60 | 24.7 | −50 |

If the ultraviolet cured resin layer 3 is thinner than 30 $\mu$m, data cannot be read out without an error because of increase of noise caused by large cross talk between faces of −30 dB or less.

However, if the ultraviolet cured resin layer 3 is thicker than 80 $\mu$m, the degree of focusing in a jump between layers is insufficient, servo control is unstable and a stable jump between layers cannot be obtained.

However, when the thickness of the ultraviolet cured resin layer 3 is changed even if the thickness of the substrate 1 of the above-described multilayer optical information medium C is set thick to 0.65 $\mu$m, the signal to noise ratio (S/N) of the second read only type planar information area is varied as shown in Table 3:

TABLE 3

| Thickness of ultraviolet cured resin layer 3 ($\mu$m) | S/N (dB) of second read only type planar information area (dB) |
| --- | --- |
| 25 | 24.3 |
| 30 | 24.0 |
| 35 | 23.8 |
| 40 | 23.5 |
| 45 | 23.3 |

That is, if the thickness of the ultraviolet cured resin layer 3 is 30 $\mu$m even if the thickness of the substrate 1 is set thick to 0.65 mm, S/N is 24 dB, cross talk between faces is −30 dB and data can be read out without an error.

If the reflectance of each planar information area of the above-described multilayer optical information medium C measured by focusing on each planar information area from the side of the substrate 1 is changed, the signal to noise ratio (S/N) of the first and second read only type planar information areas is varied as shown in Table 4:

TABLE 4

| Reflectance of first planar information area (%) | Reflectance of second planar information area (%) | S/N of first planar information area (dB) | S/N of second planar information area (dB) |
| --- | --- | --- | --- |
| 55 | 5 | 26.0 | 23.5 |
| 50 | 10 | 26.0 | 24.0 |
| 45 | 15 | 25.8 | 24.3 |
| 40 | 20 | 25.5 | 24.5 |
| 35 | 25 | 25.3 | 24.8 |
| 30 | 30 | 25.0 | 25.0 |
| 25 | 40 | 24.8 | 25.5 |
| 20 | 50 | 24.5 | 26.0 |
| 15 | 60 | 243. | 26.0 |
| 10 | 69 | 24.0 | 26.0 |
| 5 | 77 | 23.5 | 26.0 |

When the reflectance of the first read only type planar information area exceeds 50%, that of the second read only type planar information area is smaller than 10% as shown in Table 4. When the reflectance of the first and second read only type planar information areas is smaller than 10%, the signal to noise ratio (S/N) is smaller than 24 dB which is the lowest level at which data can be read out without an error due to increase of disk noise.

When the difference between the respective reflectance of the first and second read only type planar information areas is 20% or less, that is, in the range of ±10%, servo control is applied stably without adjustment after a jump between the first and second read only type planar information areas, however, when the difference between the respective reflectance exceeds 20%, the gain of servo is required to be adjusted after a jump between layers.

If the reflectance of each planar information area of the above-described multilayer optical information medium C measured by focusing on each planar information area from the side of the substrate 1' is changed, the signal to noise ratio (S/N) of the third and fourth read only type planar information areas is respectively varied as the result shown in items of the first and second read only type planar information areas in Table 4.

If another dielectric or metal is used in addition to a mixture of silicon and silicon nitride used in this embodiment for a semi-reflective layers 2 and 2' of the above-described multilayer optical information medium C, the similar result to that in this embodiment can be also obtained by laminating so that the reflectance of each planar information area measured by focusing on the first and third read only type planar information areas from the substrate 1 or 1' is approximately 30%. If at least one of silicon, silicon nitride, silicon oxide, germanium, germanium oxide, germanium nitride, zinc sulfide and aluminum nitride is used as the above-described dielectric or at least one of aluminum, an aluminum alloy, a gold alloy, silver, a silver alloy, copper and a copper alloy is used as the above-described metal, the similar result to that in this embodiment can be also obtained.

If another metallic layer formed by a gold alloy, silver, a silver alloy, copper or a copper alloy is used as the reflective layers 4 and 4' of the above-described multilayer optical information medium C in addition to gold used in this embodiment, the similar result to that in this embodiment can be also obtained.

If an epoxy reactive adhesive is used for the adhesive layer 6 of the above-described multilayer optical information medium C instead of a silicone reactive adhesive used in this embodiment, the similar result to that in this embodiment can be also obtained. Each multilayer optical information medium can be stuck at a low cost by using a hot melt adhesive and even if each multilayer optical information medium is stuck without coating the protective layers 5 and 5' formed by ultraviolet cured resin or others on a substrate before sticking by using ultraviolet cured resin, the similar result to that in this embodiment can be obtained.

If a polyolefine or PMMA substrate fabricated by injection molding is used instead of the polycarbonate substrate fabricated by injection molding which is used in this embodiment or if a substrate wherein an ultraviolet cured resin layer provided with a planar information area is formed on the surface of a glass or resin substrate by photo polymerization is used, the similar result to that in this embodiment can be also obtained.

(Second Embodiment)

Figure 2:
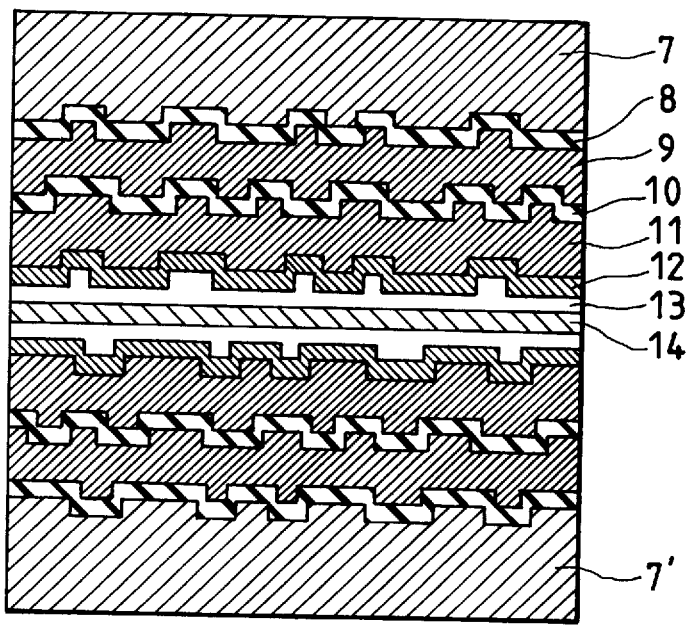
FIG. 2 is a sectional view showing a multilayer optical information medium equivalent to a second embodiment according to the present invention.

FIG. 2 is an enlarged view showing the section of an optical information medium equivalent to a second embodiment according to the present invention. A substrate 7 wherein information is formed as optical embossed pits on the surface of a disk-shaped polycarbonate plate 120 mm in diameter and 0.56 mm thick by injection molding is fabricated. Silicon is sputtered on the above-described substrate 7 using gas made by mixing nitrogen equivalent to 6% with argon by a radio-frequency magnetron sputtering device and a semi-reflective layer 65 nm thick 8 consisting of a mixture of silicon and silicon nitride with optical constants of 2.45-0.04 i is formed so as to constitute a first read only type planar information area.

Next, using ultraviolet cured resin, an ultraviolet cured resin layer 40 μm thick 9 wherein information is formed as optical embossed pits by photo polymerization for transferring optical embossed pits through a stamper is formed. In this case, ultraviolet rays are irradiated from the side of the substrate through a stamper which is a metal mold made of nickel. Thereon, a semi-reflective layer 55 nm thick 10 consisting of a mixture of silicon and silicon nitride with optical constants of 3.00-0.12 i is formed by sputtering silicon using gas generated by mixing nitrogen equivalent to 5% with argon by the above-described sputtering device to constitute a second read only type planar information area.

Thereon, using ultraviolet cured resin again, an ultraviolet cured resin layer 40 μm thick 11 wherein information is formed as optical embossed pits by photo polymerization for transferring optical embossed pits through a stamper is formed. Thereon, a reflective layer 50 nm thick 12 consisting of gold is formed by sputtering using argon gas to constitute a third read only type planar information area. Further, after an ultraviolet cured resin layer 10 μm thick is formed by coating ultraviolet cured resin spinning, ultraviolet rays are irradiated so that the above-described layer is cured and a protective layer 13 is formed so as to fabricate an optical information medium D.

Similarly, another optical information medium E provided with the fourth to sixth read only type planar information areas is fabricated on a substrate 7'. The optical information mediums D and E are stuck together by an adhesive layer 14 so that the respective substrates are set outside so as to fabricate a multilayer optical information medium F. In this case, after an epoxy reactive adhesive is deposited on the protective layer 13 of the optical information medium D by 50 μm spinning the epoxy reactive adhesive, the optical information medium E is stuck on the optical information medium D in a vacuum so that no bubble enters between the optical information mediums.

Data is read out from the multilayer optical information medium F fabricated as described above by an optical disk drive (semiconductor laser beam wavelength: 635 nm, numerical aperture (NA) of objective lens: 0.6) and the read out data is evaluated. The disk is rotated at fixed linear or angular velocity and a continuous beam from a semiconductor laser is focused on each planar information area in an arbitrary radius thereof through the substrate 7 or 7' with an objective lens in an optical head. When the above-described multilayer optical information medium F is rotated at linear velocity of 3.3 m/sec. and data consisting of embossed pits (pit depth: 80 nm, mark length: 0.45 μm, mark pitch: 0.9 μm, track pitch: 0.74 μm) is read out at the level of light for reading out of 0.8 mW on the surface of the medium, even if any of the first, third, fourth and sixth read only type planar information areas is read out, a read out signal with a carrier to noise ratio (C/N) of 52.7 dB in resolution band width of 30 kHz and a signal to noise ratio (S/N) of 24.7 dB in a frequency band of 9 MHz is outputted. When the second and fifth read only type planar information areas are read out, a read out signal with a carrier to noise ratio (C/N) of 53.2 dB in resolution band width of 30 kHz and a signal to noise ratio (S/N) of 25.2 dB in a frequency band of 9 MHz is outputted. Cross talk between faces at this time from an adjacent planar information area is −40.5 dB.

The reflectance of the first to sixth read only type planar information areas viewed from the side of the substrate of the optical information medium D or E in the above-described multilayer optical information medium F is measured with the above-described optical head and the reflectance is respectively 18%.

If the thickness of the substrate 7 of the above-described multilayer optical information medium F is changed, the signal to noise ratio (S/N) of the first to third read only type planar information areas is varied as shown in Table 5:

TABLE 5

| Thickness of substrate 1 (mm) | S/N of first planar information area (dB) | S/N of second planar information area (dB) | S/N of third planar information area (dB) |
| --- | --- | --- | --- |
| 0.51 | 23.5 | 24.5 | 25.1 |
| 0.52 | 24.0 | 24.7 | 25.2 |
| 0.54 | 24.3 | 25.0 | 25.0 |
| 0.56 | 24.7 | 25.2 | 24.7 |
| 0.58 | 25.0 | 25.0 | 24.3 |
| 0.60 | 25.2 | 24.7 | 24.0 |
| 0.61 | 25.1 | 24.5 | 23.5 |

If the substrate 7 is thinner than 0.52 mm or thicker than 0.60 mm, the signal to noise ratio (S/N) is smaller than 24 dB which is the lowest level at which data can be read out without an error because of increase of noise due to spherical aberration.

However, if the thickness of the ultraviolet cured resin layers 9 and 11 is respectively 30 μm even if the thickness of the substrate 7 is set thick to 0.62 μm, S/N of the first to third read only type planar information areas is respectively 25 dB, 24.5 dB and 24 dB, cross talk between faces in each planar information area is −30 dB and data can be read out without an error.

(Third Embodiment)

Figure 3:
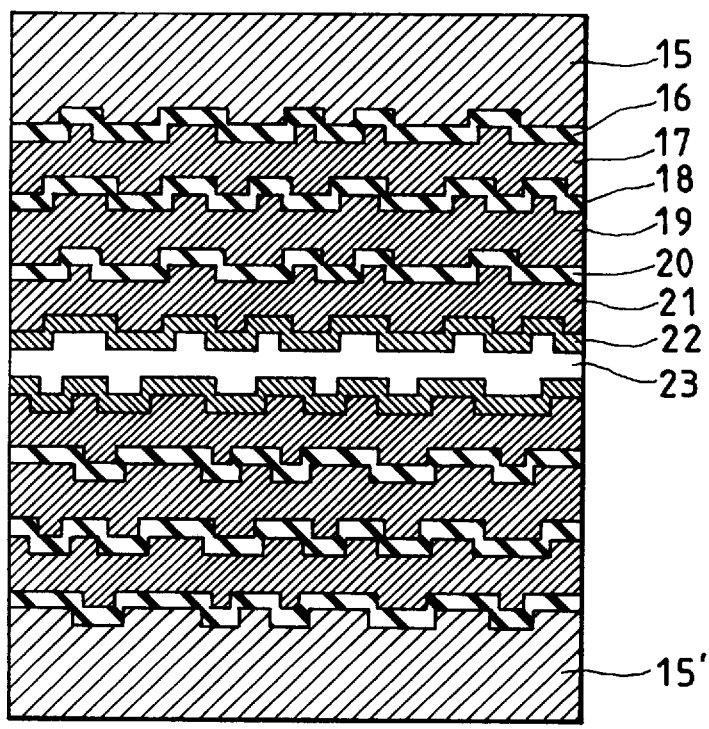
FIG. 3 is a sectional view showing a multilayer optical information medium equivalent to a third embodiment according to the present invention.

FIG. 3 is an enlarged view showing the section of an optical information medium equivalent to a third embodiment according to the present invention. A substrate 15 wherein information is formed as optical embossed pits on the surface of a disk-shaped polycarbonate plate 120 mm in diameter and 0.54 mm thick by injection molding is fabricated. Silicon is sputtered on the above-described substrate using gas made by mixing nitrogen equivalent to 7% with argon by a radio-frequency magnetron sputtering device and a semi-reflective layer 70 nm thick 16 consisting of a mixture of silicon and silicon nitride with optical constants of 2.25-0.02 i is formed so as to constitute a first read only type planar information area.

Next, using ultraviolet cured resin, an ultraviolet cured resin layer 40 µm thick 17 wherein information is formed as optical embossed pits by photo polymerization for transferring optical embossed pits through a stamper is formed. In this case, ultraviolet rays are irradiated from the side of a mold through a stamper which is a transparent mold made of plastic. Thereon, a semi-reflective layer 65 nm thick 18 consisting of a mixture of silicon and silicon nitride with optical constants of 2.45-0.04 i is formed by sputtering silicon using gas made by mixing nitrogen equivalent to 6% with argon by the above-described sputtering device to constitute a second read only type planar information area.

Thereon, using ultraviolet cured resin again, an ultraviolet cured resin layer 40 µm thick 19 wherein information is formed as optical embossed pits by photo polymerization for transferring optical embossed pits through a stamper is formed. Thereon, a semi-reflective layer 55 nm thick 20 consisting of a mixture of silicon and silicon nitride with optical constants of 3.00-0.12 i is formed by sputtering silicon using gas made by mixing nitrogen equivalent to 5% with argon with the above-described sputtering device to constitute a third read only type planar information area.

Thereon, using ultraviolet cured resin again, an ultraviolet cured resin layer 40 µm thick 21 wherein information is formed as optical embossed pits by photo polymerization for transferring optical embossed pits through a stamper is formed. Thereon, a reflective layer 50 nm thick 22 consisting of gold is formed by sputtering using argon gas so as to constitute a fourth read only type planar information area and an optical information medium G is fabricated.

Similarly, another optical information medium H provided with the fifth to eighth read only type planar information areas is fabricated on a substrate 15'. The optical information mediums G and H are stuck together by an adhesive layer 23 so that the respective substrates are set outside so as to fabricate a multilayer optical information medium I. In this case, after ultraviolet cured resin is dropped on the reflective layer 22 of the optical information medium G, the optical information mediums G and H are stuck, after the stuck optical information medium 40 µm thick is formed, expelling bubbles in resin spinning, ultraviolet rays are irradiated so that the ultraviolet cured resin is cured and two optical information mediums are completely stuck.

Data is read out from the multilayer optical information medium I fabricated as described above by an optical disk drive (semiconductor laser beam wavelength: 635 nm, numerical aperture (NA) of objective lens: 0.6) and the read out data is evaluated. The disk is rotated at fixed linear or angular velocity and a continuous beam from a semiconductor laser is focused on each planar information area in an arbitrary radius thereof through the substrate 15 or 15' with an objective lens in an optical head. When the above-described multilayer optical information medium I is rotated at linear velocity of 3.3 m/sec. and data consisting of embossed pits (pit depth: 80 nm, mark length: 0.45 µm, mark pitch: 0.9 µm, track pitch: 0.74 µm) is read out at the level of light for reading out of 1.0 mW on the surface of the medium, even if any of the first, fourth, fifth and eighth read only type planar information areas is read out, a read out signal with a carrier to noise ratio (C/N) of 52.3 dB in resolution band width of 30 kHz and a signal to noise ratio (S/N) of 24.3 dB in a frequency band of 9 MHz is outputted. When the second, third, sixth and seventh read only type planar information areas are read out, a read out signal with a carrier to noise ratio (C/N) of 53 dB in resolution band width of 30 kHz and a signal to noise ratio (S/N) of 25 dB in a frequency band of 9 MHz is outputted.

Cross talk between faces at this time from an adjacent planar information area is −40.5 dB.

The reflectance of the first to sixth read only type planar information areas viewed from the side of the substrate of the optical information medium G or H in the above-described multilayer optical information medium I is measured with the above-described optical head and the reflectance of any of read only type planar information areas is 13%.

If the thickness of the substrate 15 of the above-described multilayer optical information medium I is changed, the signal to noise ratio (S/N) of the first to fourth read only type planar information areas is varied as shown in Table 6:

TABLE 6

| Thickness of substrate 1 (mm) | S/N of first planar information area (dB) | S/N of second planar information area (dB) | S/N of third planar information area (dB) | S/N of fourth planar information area (dB) |
| --- | --- | --- | --- | --- |
| 0.51 | 23.5 | 24.5 | 24.5 | 24.9 |
| 0.52 | 24.0 | 24.7 | 24.7 | 24.7 |
| 0.54 | 24.3 | 25.0 | 25.0 | 24.3 |
| 0.56 | 24.7 | 25.2 | 25.2 | 24.0 |
| 0.57 | 24.9 | 25.1 | 25.1 | 23.5 |

If the substrate 7 is thinner than 0.52 mm or thicker than 0.56 mm, the signal to noise ratio (S/N) is smaller than 24 dB which is the lowest level at which data can be read out without an error because of increase of noise due to spherical aberration.

However, if the thickness of the ultraviolet cured resin layers 17, 19 and 21 is respectively 30 µm even if the thickness of the substrate 7 is set thick to 0.59 µm, S/N of the first to fourth read only type planar information areas is respectively 25.1 dB, 25.0 dB, 24.5 dB and 24 dB, cross talk between faces in each planar information area is −30 dB and data can be read out without an error.

(Fourth Embodiment)

Figure 4:
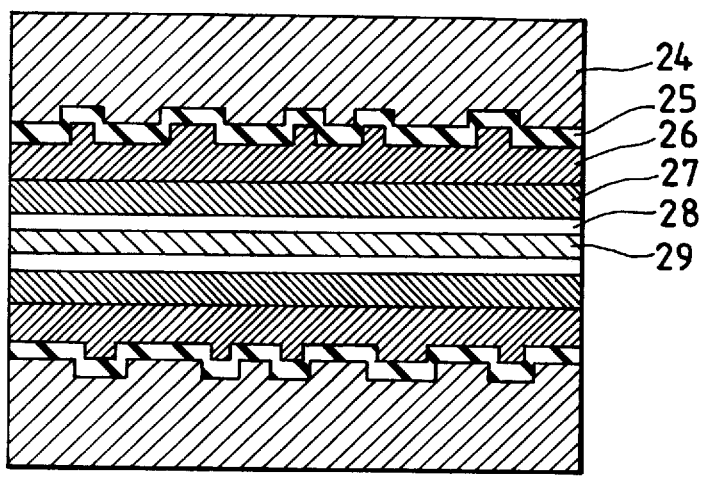
FIG. 4 is a sectional view showing a multilayer optical information medium equivalent to a fourth embodiment according to the present invention.

FIG. 4 is an enlarged view showing the section of an optical information medium equivalent to a fourth embodiment according to the present invention. A substrate 24 wherein information is formed as optical embossed pits on the surface of a disk-shaped polycarbonate plate 120 mm in diameter and 0.58 mm thick by injection molding is fabricated. Silicon is sputtered on the above-described substrate 24 using gas made by mixing nitrogen equivalent to 6% with argon by a radio-frequency magnetron sputtering device and a semi-reflective layer 65 nm thick 25 consisting of a mixture of silicon and silicon nitride with optical constants of 2.45-0.04 i is formed to constitute a first read only type planar information area.

Next, using ultraviolet cured resin, an ultraviolet cured resin layer 40 μm thick 26 wherein a U-shaped guide groove for tracking (pitch between tracks: 1.48 μm, width of land and groove: both 0.74 μm) and a prepit such as address information are formed by photo polymerization for transferring optical embossed pits through a stamper is formed. In this case, as a stamper, a transparent mold made of plastic is used and ultraviolet rays are irradiated from the side of the mold. Thereon, a first erasable type planar information area 27 consisting of a phase change type recording layer and a reflective layer is formed by a radio-frequency magnetron sputtering.

As a phase change type recording layer and a reflective layer, four-layer structure consisting of a $(ZnS)_{80}(SiO_2)_{20}$ thin film 130 nm thick, a $Ge_{21}Sb_{25}Te_{54}$ thin film 25 nm thick, a $(ZnS)_{80}(SiO_2)_{20}$ thin film 25 nm thick and a $Al_{97}Ti_3$ thin film 70 nm thick formed sequentially on the substrate is formed.

Further, after an ultraviolet cured resin layer 10 μm thick is formed by spinning ultraviolet cured resin, ultraviolet rays are irradiated so that ultraviolet cured resin is cured, as a result a protective layer 28 is formed and an optical information medium J is fabricated.

Similarly, a second read only type planar information area and another optical information medium K provided with a second erasable type planar information area are fabricated. The optical information mediums J and K fabricated as described above are stuck by an adhesive layer 29 so that the substrates are set outside to fabricate a multilayer optical information medium L. In this case, after the protective layer 28 of the optical information medium J is coated with a silicone reactive adhesive deposited by spinning by 50 μm, the optical information mediums J and K are stuck in vacuum lest bubbles enter.

Data is written, read and erased to/from/in the multilayer optical information medium L fabricated as described above by an optical disk drive (semiconductor laser beam wavelength: 635 nm, numerical aperture (NA) of objective lens: 0.6) and the read out data is evaluated.

First, the multilayer optical information medium L is rotated at fixed linear or angular velocity and a continuous beam from a semiconductor laser is focused on the first or second read only type planar information area in an arbitrary radius thereof through the substrate with an objective lens in an optical head, and information is read out by detecting the intensity of reflected light, tracking and automatically focusing so that a beam is focused on each information face. When the above-described multilayer optical information medium L is rotated at linear velocity of 3.3 m/sec. and data consisting of an array of embossed pits (pit depth: 80 nm, mark length: 0.45 μm, mark pitch: 0.9 μm, track pitch: 0.74 μm) is read out at the level of light for reading out of 0.5 mW on the surface of the medium, even if any of the first and second read only type planar information areas is read out, a read out signal with a carrier to noise ratio (C/N) of 53.0 dB in resolution band width of 30 kHz and a signal to noise ratio (S/N) of 25.0 dB in a frequency band of 9 MHz is outputted. Cross talk between faces at this time from an adjacent planar information area is −40.5 dB. The reflectance of the semi-reflective layer consisting of a mixture of silicon and silicon nitride viewed from the side of the substrate of the optical information medium J or K in the above-described multilayer optical information medium L is measured with the above-described optical head and the reflectance is 18%.

Next, a beam is focused on the first and second erasable type planar information areas and data is written, erased and read out by tracking and automatically focusing so that a beam is focused on each phase change type recording layer. The reflectance of a phase change type recording layer measured from the substrate immediate after the layer is formed is 5%, which is low, however, when the layer is entirely initialized by a laser beam with linear velocity of 3.3 m/sec. and the power of 6 mW on the surface of the disk, the reflectance is increased form 5% to 18%. The above-described multilayer optical information medium L is rotated at a linear velocity of 3.3 m/sec. and the head is driven so that a continuous beam from a semiconductor laser is irradiated in an arbitrary radius with it kept at a low power level at which recording is not performed and the center of a light spot is always located in the land or the groove portion of the U-shaped guide groove. As data is recorded in both the land and the groove portion, storage capacity can be doubled. If the depth of the guide groove is λ/6 n (λ: wavelength of a laser beam, n: refractive index of a substrate: 70 nm), cross talk from an adjacent land or groove portion can be controlled up to −30 dB or less. As described above, recording and erasure are performed concurrently by overwrite by single laser beam, tracking and automatically focusing so that a beam is focused on the phase change type recording layer. One-beam-overwrite is performed by changing the power of a laser beam between an intermediate level at which crystallization is caused (an erasure level) and a high level at which an amorphous state is caused (a recording level). It is desirable that the ratio of power between a high level and an intermediate level is in the range of 1 to 0.3 to 1 to 0.8. Hereby, already recorded data is replaced by newly recorded data.

Data is overwritten by setting the level of light for reading out to 1.0 mW in the case of a continuous beam and by changing the power of a laser beam between an intermediate level at which crystallization is caused of 6.0 mW and a high level at which an amorphous state is caused of 11.0 mW, data is read out by detecting the intensity of reflected light and the read out signal is evaluated. In this case, a signal with mark length of 0.5 μm and mark pitch of 1 μm and a signal with mark length of 1.8 μm and mark pitch of 3.6 μm are alternately overwritten. If the former signal is overwritten, a read out signal with a carrier to noise ratio of 53.0 dB in a resolution band width of 30 kHz and a ratio of erasing an original signal of 30 dB is outputted. If the latter signal is overwritten, a read out signal with a carrier to noise ratio of 58.0 dB in a resolution band width of 30 kHz and a ratio of erasing an original signal of 30 dB is outputted. The erasable frequency until a carrier to noise ratio is reduced up to 1 dB at this time is 0.1 million times or more.

For composition of a recording film in a phase change type recording layer, if a group of Ge-Sb-Te other than the above-described composite ratio, each group of Ge-Sb-Te-M (M: metallic element), Ge-Te-Se, Ge-Te-Sb-Se, In-Se, In-Se-Tl, In- Se-M (M: metallic element), In-Sb-Te, In-Sb-Se, Ga-Sb, Sn-Sb- Se and Sn-Sb-Se-Te are used, the similar result can be also obtained. If a group of In-Sb utilizing change of a phase between an crystallization and another crystallization state is used, the similar result can be also obtained.

Data is recorded, erased and read out by focusing a beam on first and second erasable type planar information areas in a multilayer optical information medium M wherein the phase change type recording layer and the reflective layer in the above-described multilayer optical information medium L are replaced by a magneto optical recording layer with four-layer structure consisting of a silicon nitride thin film 60 nm thick, a Tb-Fe-Co thin film 20 nm thick, a silicon nitride thin film 15 nm thick and an $Al_{97}Ti_3$ thin film 50 nm thick formed in the order on the substrate, tracking and automatically focusing so that a beam is focused on each magneto optical recording layer. The multilayer optical information medium M is rotated at a linear velocity of 3.3 m/sec. as the multilayer optical information medium L and the head is driven so that a continuous beam from a semiconductor laser is kept at a low power level at which recording is not performed in an arbitrary radius and the center of a light spot is always located in the land or the groove portion of the U-shaped guide groove. As data is recorded in both the land and the groove portion, storage capacity can be doubled. If the depth of the guide groove is $\lambda/6$ n ($\lambda$: wavelength of a laser beam, n: refractive index of a substrate: 70 nm), cross talk from an adjacent land or groove portion can be controlled up to −30 dB or less. As described above, a beam is automatically focused on a magneto optical recording layer tracking, a laser beam is irradiated generating a magnetic field in the direction reverse to that of initial magnetization of the magneto optical recording layer and data is written. Data is erased by irradiating a continuous beam, generating a magnetic field in the direction reverse to that of recording.

Data is read out by converting the direction of Kerr rotational angle to the intensity of reflected light by differential detection. In this case, a signal requiring the level of light for reading out of 1.0 mW in the case of a continuous beam, with recording laser power of 8 mW, mark length of 0.5 μm and mark pitch of 1 μm and a signal with mark length of 1.8 μm and mark pitch of 3.6 μm are recorded after erasure of the prior data. At this time, if the former signal is recorded, a read out signal with a carrier to noise ratio of 53.0 dB in a resolution band width of 30 kHz is outputted. If the latter signal is recorded, a read out signal with a carrier to noise ratio of 58.0 dB in a resolution band width of 30 kHz is outputted. Erasable frequency at this time until a carrier to noise ratio is reduced up to 1 dB is one million times or more.

Even if the number of a read only type planar information area on either side of the above-described multilayer optical information mediums L and M is increased to two or three and the increased areas are formed closer to the substrate than an erasable type planar information area, data in all the read only type planar information areas can be read out without an error and data is erasable 0.1 million times or more in an erasable type planar information area.

(Fifth Embodiment)

Figure 5:
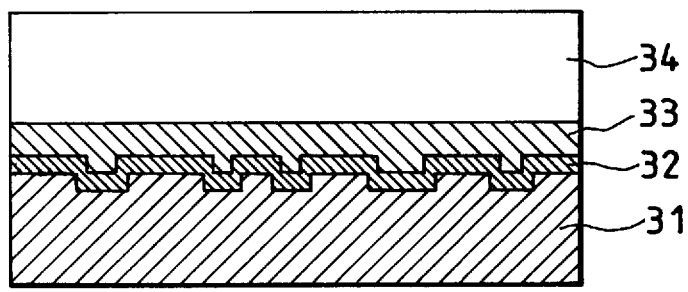
FIG. 5 is a sectional view showing an optical information medium equivalent to a fifth embodiment according to the present invention.

FIG. 5 is an enlarged view showing the section of an optical information medium equivalent to a fifth embodiment according to the present invention. A substrate 31 wherein information is formed as optical embossed pits on the surface of a disk-shaped polycarbonate plate 120 mm in diameter and 0.6 mm thick by injection molding is fabricated. An Al reflective layer 32 is formed on the above-described substrate 31 by sputtering argon gas with a radio-frequency magnetron sputtering device. After ultraviolet cured resin is dropped on the above-described substrate, a disk-shaped polycarbonate protective plate 0.6 mm thick 34 is stuck on the substrate, after the ultraviolet cured resin layer is formed into an adhesive layer 40 μm thick 33 by spinning the substrate and expelling bubbles in the resin, ultraviolet rays are irradiated so that the resin is cured and securely stuck and as a result, an optical information medium N is fabricated. In this case, the Al reflective layer 32 is fabricated under the following conditions: First, when the Al film 40 nm thick is formed using pure argon gas, discharge is suspended, next Al is deposited by 5 nm using gas made by mixing nitride of 10% with argon, then discharge is again suspended and further, Al is deposited by 40 nm using pure argon gas.

To compare with the conventional structure, an optical information medium O with the conventional structure wherein Al is continuously deposited 85 nm using pure argon gas as the reflective layer 32 is fabricated.

Figure 6:
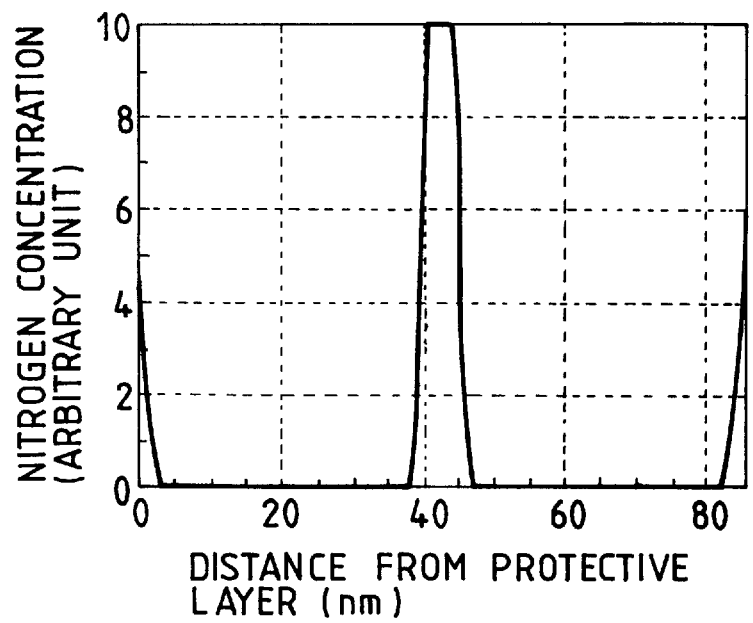
FIG. 6 shows the distribution of the density of nitrogen in a reflective layer of the optical information medium equivalent to the fifth embodiment in the direction of film thickness which is measured by Auger electron spectroscopy.

FIG. 6 shows the result of composition analysis in the direction of the depth of the reflective layer of the optical information medium N by Auger electron spectroscopy. In the optical information medium N, a high-density nitrogen layer exists in the center of the thickness.

Figure 7A:
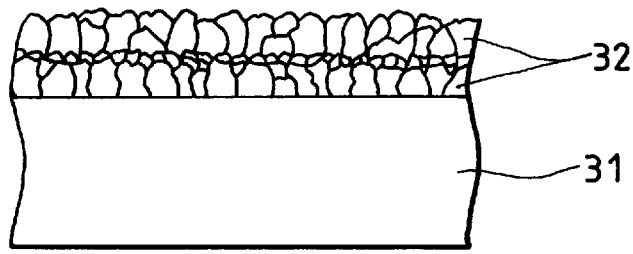
FIG. 7a is a schematic drawing showing the result of observation according to SEM of the section of the reflective layer of the optical information medium equivalent to the fifth embodiment according to the present invention.
Figure 7B:
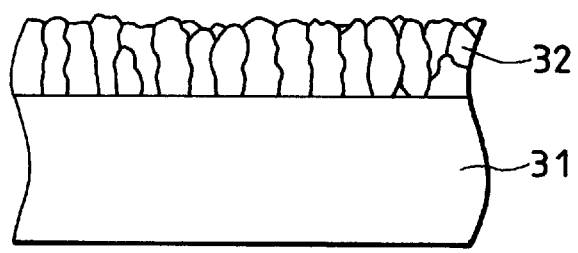
FIG. 7b is a schematic drawing showing the result of observation according to SEM of the section of the reflective layer of the conventional optical information medium.

FIGS. 7a and 7b are schematic drawings showing the result of observing the section of the reflective layer of the optical information mediums N and O with a scanning electron microscope (SEM). As shown in FIG. 7b, crystal growth is continued in the overall reflective layer of the conventional optical information medium O and the grain boundary between crystals is also connected in the overall reflective layer, while as shown in FIG. 7a, crystal growth is interrupted halfway in the reflective layer of the optical information medium N, the grain boundary between crystals is also interrupted halfway in the reflective layer and the reflective layer consists of two crystalline structures.

Data is read out from the optical information mediums N and O fabricated as described above by an optical disk drive (semiconductor laser beam wavelength: 635 nm, numerical aperture (NA) of objective lens: 0.6) and the read out data is evaluated. Each optical information medium described above is rotated at fixed linear or angular velocity and a continuous beam from a semiconductor laser is focused on the face provided with data in an arbitrary radius thereof through the substrate 31 with an objective lens in an optical head, a beam is automatically focused on the face provided with data tracking and data is read out by detecting the intensity of reflected light. When each optical information medium described above is rotated at linear velocity of 3.3 m/sec. and data consisting of embossed pits (pit depth: 80 nm, mark length: 0.4 μm, mark pitch: 0.8 μm, track pitch: 0.74 μm) is read out at the level of light for reading out of 0.3 mW on the surface of the medium, the signal to noise ratio (S/N) in a band of frequency of 9 MHz is as follows:

TABLE 7

|  | Signal to noise ratio (dB) |
| --- | --- |
| Optical information medium N | 25.0 |
| Optical information medium O | 22.0 |

In the case of the optical information medium O, the signal to noise ratio (S/N) is 22 dB due to increase of noise and is smaller than 24 dB which is the lowest level at which data can be read out without an error.

If oxygen gas or gas made by mixing nitrogen and oxygen is used in place of nitrogen mixed in argon used when the Al reflective layer 32 of the above-described optical information medium N is formed, the similar result can be obtained.

If when the Al reflective layer 40 nm thick 32 of the above-described optical information medium N is formed by sputtering using pure argon gas, sputtering is suspended, the formed Al reflective layer is exposed to the air and further Al is deposited 40 nm by sputtering, the similar result can be also obtained.

If when the Al reflective layer 40 nm thick 32 of the above-described optical information medium N is formed by sputtering using pure argon gas, AlN or $Al_2O_3$ is deposited 5 nm by sputtering and Al is further deposited 40 nm, the similar result can be also obtained.

When the content of Ti in the optical information medium P using an alloy consisting of Al and Ti in place of Al used when the reflective layer 32 of the above-described optical information medium N is formed is changed, the signal to noise ratio of the optical information medium P is varied as follows:

If the content of Ti exceeds 30%, the signal to noise ratio (S/N) is 23 dB and smaller than 24 dB which is the lowest level at which data can be read out without an error. The resistance to oxidation of the optical information medium P provided with a reflective layer consisting of an alloy of Al and Ti is better than that of the optical information medium N using an Al reflective layer.

TABLE 8

| Composition of reflectivelayer (atomic percentage) | Signal to noise ratio (dB) |
|---|---|
| $Al_{99.9}Ti_{0.1}$ | 24.5 |
| $Al_{99.9}Ti_{0.5}$ | 25.0 |
| $Al_{99}Ti_1$ | 25.5 |
| $Al_{97}Ti_3$ | 25.7 |
| $Al_{90}Ti_{10}$ | 25.5 |
| $Al_{85}Ti_{15}$ | 25.0 |
| $Al_{80}Ti_{20}$ | 24.5 |
| $Al_{70}Ti_{30}$ | 24.0 |
| $Al_{65}Ti_{35}$ | 23.0 |

If an alloy of Al and A (element denoted by A: at least one of Si, Sc, Ti, V, Cr, Mn, Fe, Co, Ni, Zn, Ga, Ge, Y, Zr, Nb, Mo, Ru, Rh, Pd, Cd, In, Sn, Sb, Te, La, Hf, Ta, W, Re, Os, Ir, Pt, Tl, Pb, Bi, Au, Ag nd Cu) is used in place of an alloy of Al and Ti used when the reflective layer of the above-described optical information medium P is formed, the result approximately equivalent to the results shown in Table 8 can be also obtained.

Of the elements denoted by "A" described above, Ti is excellent in resistance to oxidation and Zr and Hf are excellent in low noise.

If two or more high-density nitrogen layers exist in the reflective layer 32 of the above-described optical information medium N, the similar result to that of the optical information medium N in this embodiment can be also obtained.

If the whole thickness of the reflective layer 32 of the above-described optical information medium N is thicker than 20 nm and thinner than 500 nm, the reflectance of the medium is uniform in any area of the optical information medium, noise is reduced, the resistance to environment is also satisfactory and the characteristics for reading out equivalent to those of the optical information medium N can be obtained. In the meantime, if the whole thickness of the reflective layer 32 is thinner than 20 nm, the reflectance of the medium is uneven, noise is increased, S/N is smaller than 24 dB which is the lowest level at which data can be read out without an error. If the whole thickness of the reflective layer 32 exceeds 500 nm, the resistance to environment is deteriorated and if a cycle check is repeated between temperature of 20° C. and 60° C., noise is increased and S/N is smaller than 24 dB which is the lowest level at which data can be read out without an error.

If a polyolefine or PMMA substrate fabricated by injection molding is used in place of the polycarbonate substrate fabricated by injection molding as a substrate used in this embodiment or if a substrate provided with an ultraviolet cured resin layer provided with a data face formed on the surface of a glass or resin substrate by photo polymerization is used, the similar result to that in this embodiment can be also obtained.

(Sixth Embodiment)

Figure 8:
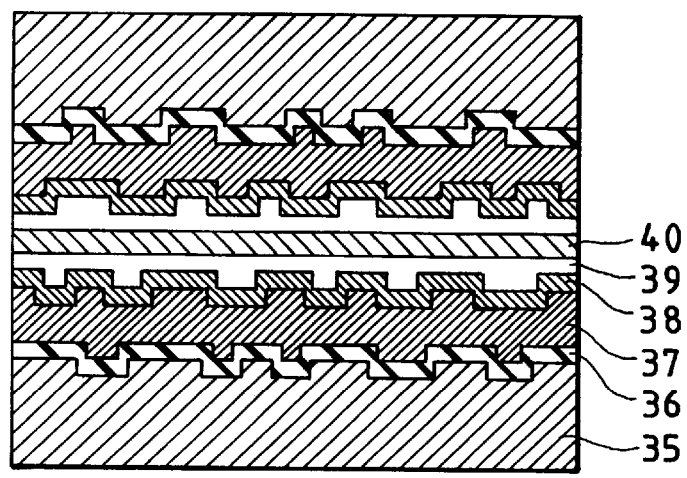
FIG. 8 is a sectional view showing a multilayer optical information medium equivalent to a sixth embodiment according to the present invention.

FIG. 8 is an enlarged view showing the section of a multilayer optical information medium equivalent to a sixth embodiment according to the present invention. A substrate 35 wherein information is formed as optical embossed pits on the surface of a disk-shaped polycarbonate plate 120 mm in diameter and 0.58 mm thick by injection molding is fabricated. Silicon is sputtered on the above-described substrate 35 using gas made by mixing nitrogen equivalent to 5% with argon by a radio-frequency magnetron sputtering device and a semi-reflective layer 55 nm thick 36 consisting of a mixture of silicon and silicon nitride with optical constants of 3.00-0.12 i is formed to constitute a first read only type planar information area.

Next, using ultraviolet cured resin, an ultraviolet cured resin layer 40 μm thick 37 wherein information is formed as optical embossed pits by photo polymerization for transferring optical embossed pits through a stamper is formed. In this case, ultraviolet rays are irradiated from the side of a mold through a stamper which is a transparent mold made of plastic. Thereon, an Al reflective layer 38 is formed by sputtering using argon gas by the above-described sputtering device to constitute a second read only type planar information area. In this case, the reflective layer 38 is formed under the following conditions: First, when an Al layer 40 nm thick is formed using pure argon gas, discharge is suspended, when next Al is deposited 5 nm using gas made by mixing oxygen equivalent to 10% with argon, discharge is again suspended and further, Al is deposited 40 μm using pure argon gas.

Further, after the reflective layer 38 is coated with ultraviolet cured resin by 10 μm by spinning the resin, ultraviolet rays are irradiated so that the resin is cured, a protective layer 39 is formed, as a result, an optical information medium Q1 is fabricated. Similarly, an optical information medium Q2 is fabricated. The optical information mediums Q1 and Q2 are stuck together by an adhesive layer 40 so that respective substrates are set outside and as a result, a multilayer optical information medium Q is fabricated. In this case, after a silicone reactive adhesive 50 μm thick is deposited on the protective layer 39 of the optical information medium Q1 spinning the adhesive, the optical information mediums Q1 and Q2 are stuck together in vacuum lest bubbles enter.

For comparison, a multilayer optical information medium R consisting of only a reflective layer 38 formed by depositing Al continuously 85 nm using pure argon gas is fabricated.

Data is read out from the multilayer optical information mediums Q and R fabricated as described above by an optical disk drive (semiconductor laser beam wavelength: 635 nm, numerical aperture (NA) of objective lens: 0.6) and the read out data is evaluated. The above-described multilayer optical information medium is rotated at fixed linear or angular velocity and a continuous beam from a semiconductor laser is focused on each planar information area in an arbitrary radius thereof through the substrate 35 with an objective lens in an optical head. A beam is automatically focused on a face provided with each data, tracking and data is read out by detecting the intensity of reflected light. When the above-described multilayer optical information mediums Q and R are rotated at linear velocity of 3.3 m/sec. and data (data bit length: 0.275 µm, repetition signal for 3 Tw (Tw: width of detecting window) in 8 to 15 modulation) consisting of embossed pits (pit depth: 80 nm, mark length: 0.44 µm, mark pitch: 0.88 µm, track pitch: 0.74 µm) is read out at the level of light for reading out of 0.5 mW on the surface of the medium, even if data in any read only type planar information area of the multilayer optical information medium Q is read out, a read out signal with a signal to noise ratio (S/N) of 25.0 dB in resolution band width of 30 kHz and in a frequency band of 9 MHz is outputted. Cross talk between faces at this time from an adjacent planar information area is −40.5 dB.

The reflectance viewed from the side of the substrate 35 of the semi-reflective layer 36 and the Al reflective layer 38 consisting of a mixture of silicon and silicon nitride is measured by the above-described optical head and the value is respectively 30%.

In the meantime, if data in any read only type planar information area of the multilayer optical information medium R is read out, the signal to noise ratio (S/N) in resolution band width of 30 kHz and in a band of frequency of 9 MHz is 22.0 dB due to increase of noise and is smaller than 24 dB which is the lowest level at which data can be read out without an error.

If when a reflective layer including at least one layer which is a high-density layer formed by at least one of oxygen or nitrogen is formed in only a read only type planar information area farthest from the substrate and a semi-reflective layer is formed in other read only type planar information areas, the reflectance of any planar information area measured by an optical head is 18% in case the number of planar information areas is 3 and 13% in case the number is 4 even if three or four read only type planar information areas are provided on either side of the above-described multilayer optical information medium Q, the similar result to the characteristics for reading out of each read only type planar information area of the above-described multilayer optical information medium Q can be obtained.

If nitrogen or mixed gas of nitrogen and oxygen is used in place of oxygen mixed in argon used when the Al reflective layer 38 of the above-described optical information medium Q1 is formed, the similar result can be also obtained.

If when the Al reflective layer 38 of the optical information medium Q1 is formed, pure argon gas is used, and when Al is deposited 40 nm by sputtering, sputtering is suspended, the layer is exposed to the air and further, Al is deposited 40 nm by sputtering, the similar result can be also obtained.

If when the Al reflective layer 38 of the optical information medium Q1 is formed, pure argon gas is used, and when Al is deposited 40 nm by sputtering, AlN or $Al_2O_3$ is deposited 5 nm by sputtering and further, Al is deposited 40 nm by sputtering, the similar result can be also obtained.

(Seventh Embodiment)

Figure 9:
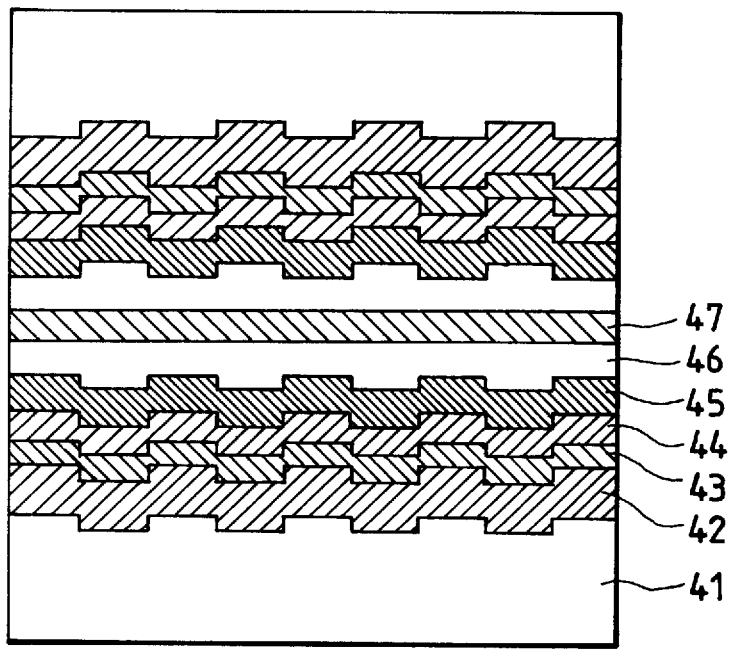
FIG. 9 is a sectional view showing a multilayer optical information medium equivalent to a seventh embodiment according to the present invention.

FIG. 9 is an enlarged drawing showing the section of an optical information medium equivalent to a seventh embodiment according to the present invention. First, a lower dielectric layer 42 the atomic percentage and the composition of which is $(ZnS)_{80}(SiO_2)_{20}$ 130 nm thick is formed by a radio-frequency magnetron sputtering device on a replica substrate 41 wherein a spiral U-shaped groove for tracking is formed on the surface of a disk-shaped polycarbonate plate 120 mm in diameter and 0.6 mm thick by injection molding so that the width of the land and the groove portion is both 0.74 µm and the depth of the groove is 72 nm. Next, a recording layer 25 nm thick 43 the atomic percentage and the composition of which is $Ge_{21}Sb_{26}Te_{53}$ is formed in the same sputtering device. Further, an upper dielectric layer 25 nm thick 44 the composition of which is $(ZnS)_{80}(SiO_2)_{20}$ is formed in the same sputtering device. Thereon, a reflective layer 85 nm thick 45 mainly made from $Al_{97}Ti_3$ is formed in the same sputtering device. The above-described reflective layer 45 is formed under the following conditions: When first $Al_{97}Ti_3$ is deposited 40 nm using argon gas, discharge is suspended and next, when $Al_2O_3$ is deposited 5 nm, discharge is again suspended and further, $Al_{97}Ti_3$ is deposited 40 nm. After ultraviolet cured resin is deposited by 10 µm on the above-described reflective layer 45 spinning the resin, a protective layer 46 cured by irradiating ultraviolet rays is formed and as a result, an optical information medium S1 is fabricated.

Similarly, an optical information medium S2 is fabricated. These optical information mediums S1 and S2 are stuck together by an adhesive layer 47 so that respective substrates are set outside to fabricate a multilayer optical information medium S. In this case, after a silicone reactive adhesive is deposited by 50 µm on the protective layer 46 of the optical information medium S1 spinning the adhesive, the optical information mediums S1 and S2 are stuck in vacuum lest bubbles enter.

For comparison, a multilayer optical information medium T provided with only the reflective layer 45 formed by depositing $Al_{97}Ti_3$ continuously by 85 nm using pure argon gas is fabricated.

The multilayer optical information mediums S and T fabricated as described above are used as a phase change type erasable type optical information medium wherein when a light spot for recording is irradiated, atomic arrangement is varied without change of a shape and optical constants are varied, data is written, erased and read out to/in/from the multilayer optical information mediums S and T by an optical disk drive (semiconductor laser beam wavelength: 650 nm, maximum power on the surface of a medium: 18 mW, numerical aperture (NA) of objective lens: 0.6), and the characteristics for reading out are evaluated. As the state immediately after the above-described multilayer optical information mediums are fabricated is amorphous and the reflectance of the mediums is low, in detail 8%, the whole mediums are initialized by a laser beam with a linear velocity of 5.6 m/sec. and power of 18 mW on the surface of a medium and the reflectance is increased from 8% to 34%.

The above-described multilayer optical information mediums S and T are rotated at a linear velocity of 6.6 m/sec. and the head is driven so that a continuous beam from a semiconductor laser is kept at a low power level at which recording is not performed in an arbitrary radius, data is read out by detecting reflected light and the center of a light spot is always located in the land or the groove portion of the U-shaped guide groove. As data is recorded in both the land and the groove portion, storage capacity can be doubled. If the depth of the guide groove is approximately λ/6 n (λ: wavelength of a laser beam, n: refractive index of a substrate: 70 nm), cross talk from an adjacent land or groove portion can be controlled up to −30 dB or less. Recording and erasure are performed concurrently in both the land and the groove portion by overwrite by a ray of light. One-beam-overwrite is performed by changing the power of a laser beam between an intermediate level at which crystallization is caused and a high level at which an amorphous state is caused. It is particularly desirable that the ratio of power between the high level and the intermediate level is in the range of 1 to 0.4 to 1 to 0.8. Already recorded data is replaced by newly recorded data by overwrite by a ray of light.

Data is written to the above-described multilayer optical information mediums S and T by setting the linear velocity to 6.6 m/sec. and the level of light for reading out to 1.0 mW and changing the power of a laser beam between an intermediate level (on the surface of a medium) at which crystallization is caused and a high level (on the surface of a medium) at which an amorphous state is caused. Data is read out by irradiating a continuous beam with power of 1.0 mW on the surface of a medium at the level of a light spot for reading out at which recording and erasure are not performed on a track recorded as described above, tracking and automatically focusing and detecting the intensity of this reflected light.

Data is overwritten by dividing a 16T repetition signal (1.41 MHz, duty: 50%) and a 3T repetition signal (7.5 MHz, duty: 50%) in modulation 8 to 15 with data bit length of 0.275 μm into multiple pulses with a frequency of 22.5 MHz and duty of 50% and modulating a laser beam for recording between a high power level of 16 mW and an intermediate power level of 9 mW. First, a 16T repetition signal in modulation 8 to 15 is recorded and the reflectance of an area on which a laser beam for recording is irradiated is reduced from 34% to 12%. A carrier to noise ratio is measured in resolution band width of 30 kHz and a read out signal of 60 dB can be obtained from the multilayer optical information medium S, while a read out signal of 57 dB can be obtained from the multilayer optical information medium T. Thereon, a 3T repetition signal in modulation 8 to 15 is overwritten and at the carrier to noise ratio in a band of 30 kHz, a read out signal of 54 dB can be obtained from the multilayer optical information medium S, while a read out signal of 51 dB can be obtained from the multilayer optical information medium T.

The erasable frequency of the above-described multilayer optical information medium S is 0.1 million times or more and is a satisfactory value.

The multilayer optical information medium S is also excellent in resistance to oxidation and even if it is left for 3,000 hours under the conditions of temperature of 60° C. and relative humidity of 95%, the reflectance or transmittance of the medium for a laser beam is unchanged. Even if the multilayer optical information medium S wherein a 3T repetition signal in modulation 8 to 15 is overwritten at a linear velocity of 6.6 m/sec. beforehand is left for 3,000 hours under the conditions of temperature of 60° C. and relative humidity of 95%, the modulation factor and carrier to noise ratio of a read out signal are both unchanged.

If a reflective layer formed by suspending discharge when $Al_{97}Ti_3$ is deposited 40 nm using pure argon gas, by again suspending discharge when it is deposited 5 nm using gas made by mixing nitrogen equivalent to 10% in argon and further, by depositing it 40 nm using pure argon gas is used in place of the reflective layer 45 of the above-described multilayer optical information medium S, the similar result can be also obtained. If oxygen or mixed gas of nitrogen and oxygen is used in place of nitrogen mixed in argon used when the above-described reflective layer is formed, the similar result can be also obtained.

If pure argon gas is used when the reflective layer 45 of the multilayer optical information medium S is formed, sputtering is suspended and the formed layer is exposed to the air when $Al_{97}Ti_3$ is deposited 40 nm by sputtering, and further $Al_{97}Ti_3$ is deposited 40 nm by sputtering, the similar result can be also obtained.

If pure argon gas is used when the reflective layer 45 of the multilayer optical information medium S is formed, AlN in place of $Al_2O_3$ is deposited 5 nm by sputtering when $Al_{97}Ti_3$ is deposited 40 nm by sputtering and further, $Al_{97}Ti_3$ is deposited 40 nm, the similar result can be also obtained.

If an alloy of Al and A (element denoted by A: at least one of Si, Sc, Ti, V, Cr, Mn, Fe, Co, Ni, Zn, Ga, Ge, Y, Zr, Nb, Mo, Ru, Rh, Pd, Cd, In, Sn, Sb, Te, La, Hf, Ta, W, Re, Os, Ir, Pt, Tl, Pb, Bi, Au, Ag nd Cu) is used in place of an alloy of Al and Ti used when the reflective layer of the above-described optical information medium S is formed, the result approximately equivalent to the above-described results can be also obtained.

Of the elements denoted by "A" described above, Ti is excellent in resistance to oxidation and Zr and Hf are excellent in low noise.

If the whole thickness of the above-described reflective layer 45 is thicker than 20 nm and thinner than 500 nm, the reflectance of the medium is uniform in any area of the optical information medium, noise is reduced, the resistance to environment is also satisfactory and the characteristics for reading out equivalent to those of the multilayer optical information medium S can be obtained. In the meantime, if the whole thickness of the reflective layer 45 is thinner than 20 nm, the reflectance of the medium is uneven, noise is increased by 4 dB. If the whole thickness of the reflective layer 45 exceeds 500 nm, recording sensitivity thereof is deteriorated, recording power thereof is increased by 20% or more, the resistance to environment is deteriorated and if a cycle check is repeated between temperature of 20° C. and 60° C., noise is increased 4 dB or more.

If data (data bit length: 0.275 μm, a 3 Tw (Tw: width of detecting window) repetition signal in modulation 8 to 15) consisting of arrays of embossed pits (pit depth: 80 nm, mark length: 0.44 μm, mark pitch: 0.88 μm, track pitch: 0.74 μm) is provided beforehand as optical embossed pits on the substrate in a part of an optical information medium equivalent to this embodiment, the whole data can be also read out without an error as a so-Called ROM and RAM mixed type optical information medium.

If a polyolefine or PMMA substrate fabricated by injection molding is used in place of the polycarbonate substrate fabricated by injection molding as a substrate used in this embodiment or if a substrate provided with an ultraviolet cured resin layer in which information is provided as optical embossed pits on the surface of a glass or resin substrate by photo polymerization is used, the similar result to that in this embodiment can be also obtained.

(Eighth Embodiment)

Figure 10:
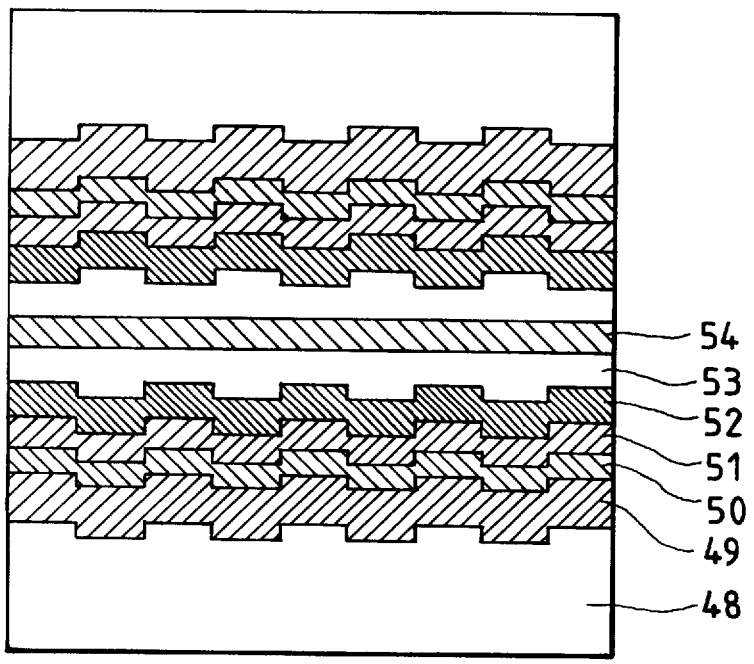
FIG. 10 is a sectional view showing a multilayer optical information medium equivalent to an eighth embodiment according to the present invention.

FIG. 10 is an enlarged drawing showing the section of an optical information medium equivalent to an eighth embodiment according to the present invention. First, a lower dielectric layer 60 nm thick 49 consisting of silicon nitride is formed by a radio-frequency magnetron sputtering device on a replica substrate 48 wherein a spiral U-shaped groove for tracking is formed on the surface of a disk-shaped polycarbonate plate 120 mm in diameter and 0.6 mm thick by injection molding so that the width of the land and the groove portion is both 0.74 μm and the depth of the groove is 72 nm. Next, a recording layer 20 nm thick 50 the atomic percentage and the composition of which is $Tb_{28}Fe_{62}Co_{10}$ is formed in the same sputtering device. Further, an upper dielectric layer 15 nm thick 51 consisting of silicon nitride is formed in the same sputtering device. Thereon, a reflective layer 85 nm thick 52 mainly made from $Al_{97}Zr_3$ is formed in the same sputtering device. The above-described reflective layer 52 is formed under the following conditions: When first $Al_{97}Zr_3$ is deposited 40 nm using argon gas, discharge is suspended and next, when AlN is deposited 5 nm, discharge is again suspended and further, $Al_{97}Zr_3$ is deposited 40 nm. After ultraviolet cured resin is deposited by 10 µm on the above-described reflective layer 52 spinning the resin, a protective layer 53 cured by irradiating ultraviolet rays is formed and as a result, an optical information medium U1 is fabricated.

Similarly, an optical information medium U2 is fabricated and the optical information mediums U1 and U2 are stuck together by an adhesive layer 24 so that respective substrates are set outside to fabricate a multilayer optical information medium U. In this case, after a silicone reactive adhesive is deposited by 50 µm on the protective layer 53 of the optical information medium U1 spinning the adhesive, the optical information mediums U1 and U2 are stuck in vacuum lest bubbles enter.

For comparison, a multilayer optical information medium V provided with only the reflective layer 52 formed by depositing $Al_{97}Zr_3$ continuously by 85 nm using pure argon gas is fabricated.

The multilayer optical information mediums U and V fabricated as described above are used as a magneto optical erasable type optical information medium, data is written, erased and read out to/in/from the multilayer optical information mediums U and V by an optical disk drive (semiconductor laser beam wavelength: 650 nm, maximum power on the surface of a medium: 12 mW, numerical aperture (NA) of objective lens: 0.6) and the read out data is evaluated. The above-described multilayer optical information mediums U and V are rotated at a linear velocity of 6.6 m/sec., a continuous beam from a semiconductor is irradiated in an arbitrary radius with the above-described beam kept at a low power level at which recording is not performed, data is read out by detecting reflected light and the head is driven so that the center of a light spot is always located on the land or the groove portion of a U-shaped guide groove. Data is written by generating a magnetic field in the direction reverse to that of initial magnetization of the magneto optical layer by driving the head as described above and by irradiating a laser beam. Data is erased by generating a magnetic field in the direction reverse to that of recording by irradiating a continuous beam. Data is read out by detecting the direction of Kerr rotational angle by differential detection and by converting it to the intensity of reflected light. As data is written to both the land and the groove portion, storage capacity thereof can be doubled. Cross talk from an adjacent land or groove portion can be controlled up to −30 dB or less by setting the depth of the guide groove to approximately $\lambda/6$ n ($\lambda$: wavelength of a laser beam, n: refractive index of a substrate: 70 nm).

Data is written to the above-described multilayer optical information mediums U and V by setting a linear velocity thereof to 6.6 m/sec. and by setting the level of light for reading out to 1.0 mW and by changing the power of a laser beam data between a recording power level (on the surface of a medium) and a reading high power level (on the surface of a medium). Data is read out by irradiating a continuous beam of 1.0 mW on the surface of a medium at the level of light for reading out at which recording and erasure are not performed on a track recorded as described, tracking and automatically focusing and by detecting the intensity of this reflected light. Data is written by dividing a 16T repetition signal (1.41 MHz, duty: 50%) and a 3T repetition signal (7.5 MHz, duty: 50%) in modulation 8 to 15 with the length of a data bit of 0.275 µm into multiple pulses with a frequency of 22.5 MHz and duty of 50% and by modulating a laser beam between a recording power level of 9 mW and a reading power level of 1 mW, generating a magnetic field of 200 Oe in one direction.

Data is erased by irradiating a continuous laser beam of 9 mW at an erasing power level, generating a magnetic field of 200 Oe in the direction reverse to that of recording. First, a 16T repetition signal in modulation 8 to 15 is recorded, a carrier to noise ration thereof is measured in resolution band width of 30 kHz and a read out signal of 60 dB can be obtained from the multilayer optical information medium U, while a read out signal of 57 dB can be obtained from the multilayer optical information medium V. After data is erased, a 3T repetition signal in modulation 8 to 15 is recorded and at the carrier to noise ratio in a measured band of 30 kHz, a read out signal of 54 dB can be obtained from the multilayer optical information medium U, while a read out signal of 51 dB can be obtained from the multilayer optical information medium V.

The erasable frequency of the above-described multilayer optical information medium V is one million times or more and is a satisfactory value.

If in place of the reflective layer 52 of the above-described multilayer optical information medium V, a reflective layer formed by suspending discharge when $Al_{97}Zr_3$ is deposited 40 nm using pure argon gas, by suspending discharge again when $Al_{97}Zr_3$ is deposited 5 nm using gas made by mixing nitrogen equivalent to 10% in argon and further, by depositing it 40 nm using pure argon gas is used, the similar result can be also obtained.

When the above-described reflective layer 52 is formed, oxygen or mixed gas of nitrogen and oxygen is used in place of nitrogen mixed in argon. The similar result can be also obtained.

When the above-described reflective layer 52 is formed, sputtering is suspended and the layer is exposed to the air when $Al_{97}Zr_3$ is deposited 40 nm by sputtering using pure argon gas and further. $Al_{97}Zr_3$ is deposited 40 nm by sputtering. The similar result can be also obtained.

When the above-described reflective layer 52 is formed, $Al_2O_3$ is deposited 5 nm by sputtering in place of AlN when $Al_{97}Zr_3$ is deposited 40 nm by sputtering using pure argon gas and further. $Al_{97}Zr_3$ is deposited 40 nm, the similar result can be also obtained.

If an alloy of Al and A (element denoted by A: at least one of Si, Sc, Ti, V, Cr, Mn, Fe, Co, Ni, Zn, Ga, Ge, Y, Zr, Nb, Mo, Ru, Rh, Pd, Cd, In, Sn, Sb, Te, La, Hf, Ta, W, Re, Os, Ir, Pt, Tl, Pb, Bi, Au, Ag and Cu) is used in place of an alloy of Al and Zr used when the reflective layer 52 of the above-described multilayer optical information medium V is formed, the result approximately equivalent to the above-described results can be also obtained.

Of the elements denoted by "A" described above, Ti is excellent in resistance to oxidation and Zr and Hf are excellent in that noise is reduced.

If the whole thickness of the above-described reflective layer 52 is thicker than 20 nm and thinner than 500 nm, the reflectance of the medium is uniform in any area of the optical information medium, noise is reduced, the resistance to environment is also satisfactory and the characteristics for reading out equivalent to those of the multilayer optical information medium V can be obtained. In the meantime, if the whole thickness of the reflective layer 52 is thinner than 20 nm, the reflectance of the medium is uneven, noise is increased by 4 dB. If the whole thickness of the reflective layer 52 exceeds 500 nm, recording sensitivity thereof is deteriorated, recording power thereof is increased by 20% or more, the resistance to environment is deteriorated and if a cycle check is repeated between temperature of −20° C. and 60° C., noise is increased 4 dB or more.

If data (data bit length: 0.275 μm, a 3 Tw (Tw: width of detecting window) repetition signal in modulation 8 to 15) consisting of arrays of embossed pits (pit depth: 80 nm, mark length: 0.44 μm, mark pitch: 0.88 μm, track pitch: 0.74 μm) is provided beforehand as optical embossed pits on the substrate in a part of an optical information medium equivalent to this embodiment, the whole data can be also read out without an error as a so-Called ROM and RAM mixed type optical information medium.

If a polyolefine or PMMA substrate fabricated by injection molding is used in place of the polycarbonate substrate fabricated by injection molding as a substrate used in this embodiment or if a substrate provided with an ultraviolet cured resin layer in which information is provided as optical embossed pits on the surface of a glass or resin substrate by photo polymerization is used, the similar result to that in this embodiment can be also obtained.

(Ninth Embodiment)

Figure 11:
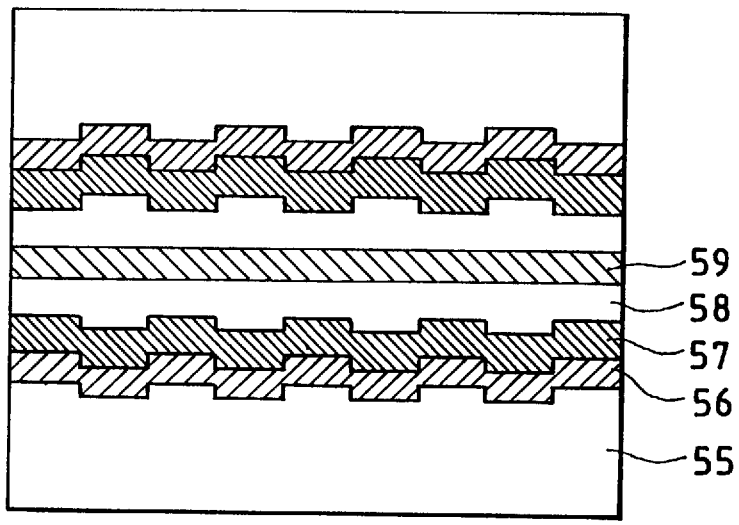
FIG. 11 is a sectional view showing a multilayer optical information medium equivalent to a ninth embodiment according to the present invention.

FIG. 11 is an enlarged drawing showing the section of an optical information medium equivalent to a ninth embodiment according to the present invention. First, a recording layer 56 consisting of dye is formed by applying cyanine which is a kind of dye 70 nm thick spinning on a replica substrate 55 wherein a spiral groove the pitch of which is 0.74 μm for tracking is formed on the surface of a disk-shaped polycarbonate plate 120 mm in diameter and 0.6 mm by injection molding. Next, a reflective layer 85 nm thick 57 mainly made by $Al_{97}Hf_3$ in atomic percentage is formed by a radio-frequency magnetron sputtering device. The above-described reflective layer 57 is formed under the following conditions: When first $Al_{97}Hf_3$ is deposited 40 nm using argon gas, discharge is suspended, the formed layer is exposed to the air and further, $Al_{97}Hf_3$ is deposited 40 nm.

After ultraviolet cured resin is deposited by 10 μm on the above-described reflective layer 57 spinning the resin, a protective layer 58 cured by irradiating ultraviolet rays is formed and as a result, an optical information medium W1 is fabricated.

Similarly, an optical information medium W2 is fabricated. The optical information mediums W1 and W2 are stuck together by an adhesive layer 59 so that respective substrates are set outside to fabricate a multilayer optical information medium W. In this case, after an epoxy reactive adhesive is deposited by 50μm on the protective layer 58 of the optical information medium W1 spinning the adhesive, the optical information mediums W1 and S2 are stuck in vacuum lest bubbles enter.

For comparison, a multilayer optical information medium X provided with only the reflective layer 57 formed by depositing $Al_{97}Hf_3$ continuously by 85 nm using pure argon gas is fabricated.

The multilayer optical information mediums W and X fabricated as described above are used as a write once type optical information medium consisting of pigment the shape of which is changed when a light spot for recording is irradiated, data is written and read out to/from the multilayer optical information mediums W and X by an optical disk drive (recorder and reader) with the above-described multilayer optical information mediums rotated at a fixed linear velocity and the read out data is evaluated as in the eighth embodiment.

Data is written by setting the linear velocity of the above-described multilayer optical information mediums W and X to 6.6 m/sec., by setting the level of light for reading out to 1.0 mW and by changing the power of a laser beam between the level of light for reading out and a recording power level (on the surface of a medium) caused by deformation due to heat of 11 mW. Data is read out by irradiating a continuous beam of 1.0 mW on the surface of a medium at the level of light for reading out at which recording and erasure are not performed on a track recorded as described above, tracking and automatically focusing and detecting the intensity of this reflected light. Data is written by dividing a 16T repetition signal (1.41 MHz, duty: 50%) and a 3T repetition signal (7.5 MHz, duty: 50%) in modulation 8 to 15 with data bit length of 0.275 μm into multiple pulses with a frequency of 22.5 MHz and duty of 50% and by modulating a laser beam for recording between a recording power level of 11 mW and a reading power level of 1 mW. First, a 16T repetition signal is recorded, the reflectance of an area in which a laser beam for recording is irradiated is reduced from 71% to 24%. The carrier to noise ratio is measured in resolution band width of 30 kHz and a read out signal of 60 dB can be obtained from the multilayer optical information medium W, while a read out signal of 57 dB can be obtained from the multilayer optical information medium X. A 3T repetition signal in modulation 8 to 15 is recorded and at the carrier to noise ratio in a band of 30 kHz, a read out signal of 54 dB can be obtained from the multilayer optical information medium W, while a read out signal of 51 dB can be obtained from the multilayer optical information medium X.

If at least one of phthalocyanine, polymethylene, naphthoquinone, rhodamine, azulene, large ring azaannulene is used as a main component in place of cyanine used for the recording layer 56 of the multilayer optical information medium W, the similar result can be also obtained.

(Tenth Embodiment)

An enlarged view showing the section of an optical information medium equivalent to a tenth embodiment according to the present invention is the same as that shown in FIG. 5. A substrate 31 wherein information is formed as optical embossed pits on the surface of a disk-shaped polycarbonate plate 120 mm in diameter and 0.6 mm by injection molding is fabricated. An aluminum reflective layer 32 is formed on the above-described substrate 31 by a radio-frequency magnetron sputtering device using argon gas. After ultraviolet cured resin is dropped thereon, a disk-shaped polycarbonate protective plate 0.6 mm thick 34 is stuck thereon, after bubbles in the resin are expelled spinning the substrate and the dropped resin is formed as an adhesive layer 40 μm thick 33, ultraviolet rays are irradiated to cure the adhesive layer and to stick the above-described protective plate on the adhesive layer and as a result, an optical information medium Y is fabricated.

The above-described aluminum reflective layer 32 is formed under the following conditions: When first aluminum is deposited 40 nm using argon gas, discharge is suspended and further, aluminum is deposited 40 nm.

For comparison, a conventional optical information medium Z provided with only the reflective layer 32 formed by depositing aluminum continuously by 80 nm using pure argon gas is fabricated.

Figure 12A:
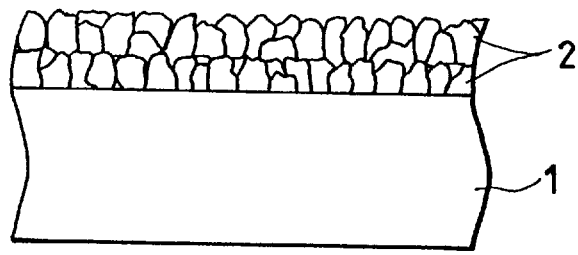
FIG. 12a is a schematic drawing showing the result of observation according to SEM of the section of a reflective layer of an optical information medium equivalent to a tenth embodiment according to the present invention.
Figure 12B:
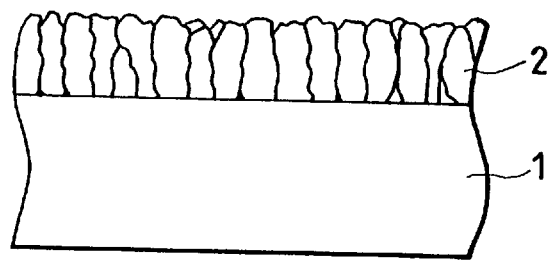
FIG. 12b is a schematic drawing showing the result of observation according to SEM of the section of a reflective layer of an optical information medium in an example for comparison.

FIGS. 12a and 12b schematically show the result of observing the section of the reflective layer of the optical information mediums Y and Z with a scanning electron microscope (SEM). As shown in FIG. 12b, crystal growth is continued in the overall reflective layer of the optical information medium Z and the grain boundary between crystals is also connected in the overall reflective layer, while as shown in FIG. 12a, crystal growth is interrupted halfway in the reflective layer of the optical information medium Y, the grain boundary between crystals is also interrupted halfway in the reflective layer.

Data is read out from the optical information mediums Y and Z fabricated as described above by an optical disk drive (semiconductor laser beam wavelength: 635 nm, numerical aperture (NA) of objective lens: 0.6) and the read out data is evaluated. Data is read out by rotating the disk at a fixed linear or angular velocity, by focusing a continuous beam from a semiconductor laser on a face on which data is stored in an arbitrary radius through the substrate 31 with an object lens of the optical head, tracking and automatically focusing and by detecting the intensity of reflected light. When the above-described optical information medium Y is rotated at a linear velocity of 3.3 m/sec. and data (data bit length: 0.25 $\mu$m, a 3 Tw (Tw: width of detecting window) repetition signal in modulation 8 to 15) consisting of embossed pits (pit depth: 80 nm, mark length: 0.4 $\mu$m, mark pitch: 0.8 $\mu$m, track pitch: 0.74$\mu$) is read out at the level of light for reading out of 0.3 mW on the surface of the medium, a read out signal with a signal to noise ratio (S/N) of 25.0 dB in resolution band width of 30 kHz and in a frequency band of 9 MHz can be obtained from the optical information medium Y even if data is read out from any read only type planar information area. The reflectance of the reflective layer 32 viewed from the side of the substrate 31 of the optical information medium Y is measured by the above-described optical head and its reflectance is 85%.

In the meantime, the signal to noise ratio (S/N) of the optical information medium Z in resolution band width of 30 kHz and in a frequency band of 9 MHz is 22.0 dB because noise is increased and is smaller than 24 dB which is the lowest level at which data can be read out without an error.

Even if the reflective layer 32 of the above-described optical information medium Y consists of three or more aluminum reflective layers, the result similar to those of the optical information medium Y in this embodiment can be obtained.

If the whole thickness of the reflective layer 32 of the above-described optical information medium Y is thicker than 20 nm and thinner than 500 nm, the reflectance of the medium is uniform in any area of the optical information medium, noise is reduced, the resistance to environment is also satisfactory and the characteristics for reading out similar to those of the optical information medium Y can be obtained. In the meantime, if the whole thickness of the reflective layer 32 is thinner than 20 nm, the reflectance of the medium is uneven, noise is increased and S/N is smaller than 24 dB which is the lowest level at which data can be read out without an error. If the whole thickness of the reflective layer 32 exceeds 500 nm, the resistance to environment is deteriorated and if a cycle check is repeated between temperature of −20° C. and 60° C., noise is increased and S/N is smaller than 24 dB which is the lowest level at which data can be read out without an error.

If a polyolefine or PMMA substrate fabricated by injection molding is used in place of the polycarbonate substrate fabricated by injection molding as a substrate used in this embodiment or if a substrate provided with an ultraviolet cured resin layer in which information is provided as optical embossed pits on the surface of a glass or resin substrate by photo polymerization is used, the similar result to that in this embodiment can be also obtained.

Eleventh Embodiment

An enlarged view showing the section of an optical information medium equivalent to an eleventh embodiment according to the present invention is the same as that shown in FIG. 8. A substrate 35 wherein information is formed as optical embossed pits on the surface of a disk-shaped polycarbonate plate 120 mm in diameter and 0.58 mm thick by injection molding is fabricated. Silicon is sputtered on the above-described substrate 35 using gas made by mixing nitrogen equivalent to 5% in argon by a radio-frequency magnetron sputtering device and a semi-reflective layer 55 nm thick 36 consisting of a mixture of silicon and silicon nitride with optical constants of 3.00 to 0.12 i is formed to constitute a first read only type planar information area.

Next, using ultraviolet cured resin, an ultraviolet cured resin layer 40 $\mu$m thick 37 wherein information is formed as optical embossed pits by photo polymerization for transferring an embossed pit through a stamper is formed. In this case, ultraviolet rays are irradiated through a stamper which is a transparent mold made of plastic from the side of the mold. Thereon, an aluminum reflective layer 38 is formed by sputtering using argon gas to constitute a second read only type planar information area. In this case, the aluminum reflective layer 38 is formed under the following conditions: First, when aluminum is deposited 40 nm using pure argon gas, discharge is suspended and further, aluminum is deposited 40 nm.

Further, after an ultraviolet cured resin layer 10 $\mu$m thick is formed on the aluminum reflective layer 38 spinning the layer, ultraviolet rays are irradiated so that the above-described layer is cured and a protective layer 39 is formed to fabricate an optical information medium α1. Similarly, a an optical information medium α2 is fabricated and the optical information mediums α1 and α2 are stuck together by an adhesive layer 40 so that respective substrates are set outside to fabricate a multilayer optical information medium α. In this case, after a silicone reactive adhesive is deposited on the protective layer 39 of the optical information medium α1 by 50 $\mu$m spinning the layer, the optical information medium α2 is stuck on the optical information medium α1 in a vacuum so that no bubble enters between the optical information mediums.

For comparison, a multilayer optical information medium β provided with only the reflective layer 38 formed by depositing aluminum continuously 80 nm using pure argon gas is fabricated.

Data is read out from the multilayer optical information mediums α and β fabricated as described above by an optical disk drive (semiconductor laser beam wavelength: 635 nm, numerical aperture (NA) of objective lens: 0.6) and the read out data is evaluated. The disk is rotated at fixed linear or angular velocity and a continuous beam from a semiconductor laser is focused on each planar information area in an arbitrary radius thereof through the substrate 35 with an objective lens in an optical head. Data is read out by detecting the intensity of reflected light, tracking and automatically focusing so that a beam is focused on the face on which data is stored of each planar information area. When the above-described multilayer optical information mediums α and β are rotated at linear velocity of 3.3 m/sec. and data (data bit length: 0.275 μm, a 3 Tw (Tw: width of detecting window) repetition signal) consisting of embossed pits (pit depth: 80 nm, mark length: 0.44 μm, mark pitch: 0.88 μm, track pitch: 0.74 μm) is read out at the level of light for reading out of 0.5 mW on the surface of the medium, a read out signal with a signal to noise ratio (S/N) of 25.0 dB in resolution band width of 30 kHz and in a frequency band of 9 MHz is outputted even if data is read out from any read only type planar information area of the multilayer optical information medium α. Cross talk between faces at this time from an adjacent planar information area is −40.5 dB. The reflectance of the semi-reflective layer 36 and the reflective layer 38 consisting of a mixture of silicon and silicon nitride viewed from the side of the substrate 35 of the above-described multilayer optical information medium α is measured with the above-described optical head and the reflectance is respectively 30%.

In the meantime, even if data is read out from any read only type planar information area of the multilayer optical information medium β, the signal to noise ratio (S/N) in resolution band width of 30 kHz and in a frequency band of 9 MHz is 22.0 dB because noise is increased and is smaller than 24 dB which is the lowest level at which data can be read out without an error.

Even if the above-described optical information mediums α1 and α2 are provided with three or four read only type planar information areas, the result similar to the characteristics for reading out of each read only type planar information area of the multilayer optical information medium α in this embodiment can be obtained by forming an aluminum reflective layer consisting of at least two layers in only the read only type planar information area farther from each substrate, by forming a semi-reflective layer on other read only type planar information areas and by setting the reflectance of any planar information area measured by an optical head to 18% in case the optical information medium is provided with three planar information areas and to 13% in case the medium is provided with four planar information areas.

Figure 13:
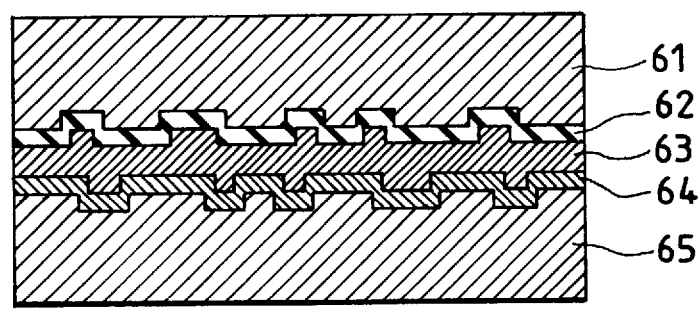
FIG. 13 is a sectional view showing a multilayer optical information medium equivalent to a twelfth embodiment according to the present invention.

If the planar information areas farthest from each substrate of the optical information mediums α1 and α2 are an erasable type recording layer, for example a phase change type recording layer, a magneto optical type recording layer or a thermic deformation type recording layer and a aluminum reflective layer consisting of at least two layers, the characteristics for reading out of each read only type planar information area are approximately the same as those of each read only planar information area of the multilayer optical information medium α and the characteristics of a recording layer for recording and reading out are also satisfactory Twelfth Embodiment FIG. 13 is an enlarged view showing the section of a multilayer optical information medium equivalent to a twelfth embodiment according to the present invention. First, a substrate 61 wherein information is formed as optical embossed pits on the surface of a disk-shaped polycarbonate plate 120 mm in diameter and 0.58 mm thick by injection molding is fabricated. A semi-reflective layer 62 consisting of three dielectric layers of a $(ZnS)_{80}(SiO_2)_{20}$(mole percentage) layer 60 nm thick, a $SiO_2$ layer 85 nm thick and $(ZnS)_{80}(SiO_2)_{20}$ layer 60 nm thick is continuously formed on this substrate 61 by a radio-frequency magnetron sputtering device using argon gas to constitute a first read only planar information area and fabricate an optical information medium γ1.

Next, a substrate 65 wherein information different from the above-described information is formed as optical embossed pits on the surface of the similar polycarbonate plate by injection molding is fabricated. An Ag layer 50 nm thick which is to be a reflective layer 64 is formed on this substrate 65 by a radio-frequency magnetron sputtering device using argon gas to fabricate an optical information medium γ2.

The optical information mediums γ1 and γ2 fabricated as described above are stuck together by a transparent adhesive layer 63 consisting of ultraviolet cured resin so that the substrates 61 and 65 are set outside to fabricate a multilayer optical information medium γ. In this case, after ultraviolet cured resin is dropped on the semi-reflective layer 62 of the optical information medium γ1, the optical information medium γ2 is stuck on the optical information medium γ1 so that they are 40 μm thick lest bubbles enter and ultraviolet rays are irradiated from the side of the optical information medium γ1 to cure the resin. A second read only type planar information area is constituted by optical embossed pits next to this transparent adhesive layer 63 on the side of the substrate 65 and the above-described reflective layer 64.

For comparison, an optical information medium δ1 which is a dielectric layer and consists of one mixture layer of silicon and silicon nitride is formed on the semi-reflective layer 62 of the optical information medium γ1 using gas made by mixing nitrogen equivalent to 5% in argon by a radio-frequency magnetron sputtering device. Similarly, an optical information medium ε1 which is one Au layer 16 nm thick is formed on the semi-reflective layer 62 of the optical information medium γ1 using argon gas by a radio-frequency magnetron sputtering device. A multilayer optical information medium δ is fabricated based upon the optical information medium δ1 and the optical information medium γ2 and a multilayer optical information medium ε is fabricated based upon the optical information medium ε1 and the optical information medium γ2.

Data is read out from the multilayer optical information mediums γ, δ and ε fabricated as described above by an optical disk drive A (laser beam wavelength: 650 nm, numerical aperture (NA) of objective lens: 0.6), by an optical disk drive B (laser beam wavelength: 532 nm, numerical aperture (NA) of objective lens: 0.6) and by an optical disk drive C (laser beam wavelength: 415 nm, numerical aperture (NA) of objective lens: 0.6) and the read out data is evaluated. The above-described drive A is used for a normal-density medium for a laser beam with a long wavelength and the drives B and C are used for a high-density medium for a laser beam with a shorter wavelength.

Data is read out by rotating the above-described each multilayer optical information medium at a fixed linear or angular velocity, by focusing a continuous beam from a semiconductor laser on the first or second read only type planar information area in an arbitrary radius through the substrate 61 with an objective lens in an optical head, tracking and automatically focusing and by detecting the intensity of reflected light.

The above-described multilayer optical information mediums γ, δ and ε are rotated at a fixed linear velocity of 3.8 m/sec. and data consisting of embossed pits (pit depth: 80 nm, mark length: 0.44 μm, mark pitch: 0.88 μm, track pitch: 0.74 μm) is read out at the level of light for reading out of 0.5 mW on the surface of the medium by the optical disk drives A, B and C. Data is read out from the first and second read only type planar information areas of the above-described each multilayer optical information medium and each signal to noise ratio (S/N) in resolution band width of 30 kHz and in a frequency band of 9 MHz is measured. Tables 11 and 12 show the measured result of data read out from the first and second read only type planar information areas. Tables 11 and 12 show the reflectance of the semi-reflective layer and the reflective layer on the side of the substrate 61 measured by the above-described optical heads.

TABLE 11

Characteristics for reading out of first read only type planar information area

|  | Multilayer optical information medium γ S/N (reflectance) | Multilayer optical information medium δ S/N (reflectance) | Multilayer optical information medium ε S/N (reflectance) |
| --- | --- | --- | --- |
| Drive A | 25 dB (33%) | 25 dB (30%) | 25 dB (33%) |
| Drive B | 25 dB (39%) | 24 dB (27%) | 19 dB (12%) |
| Drive C | 25 dB (35%) | 16 dB (9%) | 18 dB (11%) |

TABLE 12

Characteristics for reading out of second read only type planar information area

|  | Multilayer optical information medium γ S/N (reflectance) | Multilayer optical information medium δ S/N (reflectance) | Multilayer optical information medium ε S/N (reflectance) |
| --- | --- | --- | --- |
| Drive A | 25 dB (39%) | 25 dB (32%) | 25 dB (32%) |
| Drive B | 25 dB (33%) | 24 dB (27%) | 25 dB (38%) |
| Drive C | 25 dB (38%) | 21 dB (15%) | 23 dB (19%) |

The reflectance of 30% or more and S/N of 25 dB or more can be obtained in both of the first and second read only type planar information areas of the multilayer optical information medium γ by any optical disk drive A, B and C.

However, in the multilayer optical information medium δ, when the optical disk drive C is used, the signal to noise ratio (S/N) is smaller than 24 dB, in the multilayer optical information medium ε, when the first read only type planar information area is read out by the optical disk drive B and when the first and second read only type planar information areas are read out by the optical disk drive C, the signal to noise ratio (S/N) is smaller than 24 dB and S/N is smaller than 24 dB which is the lowest level at which data can be read out without an error in both cases.

Table 13 shows the signal to noise ratio (S/N) measured in the first and second read only type planar information areas by the optical disk drive A in case the thickness of the transparent adhesive layer 63 of the above-described multilayer optical information medium γ is set to 30 μm and the thickness of the substrate 61 is changed.

If the thickness of the substrate 61 is thinner than 0.52 mm or exceeds 0.65 mm, the signal to noise ratio (S/N) of either the first or second read only type planar information area is smaller than 24 dB which is the lowest level at which data can be read out without an error because of increase of noise due to spherical aberration.

Table 14 shows the measured result of the signal to noise ratio (S/N) in the second read only type planar

TABLE 13

| Thickness of substrate 61 (mm) | S/N in first read only type planar information area (dB) | S/N in second read only type planar information area (dB) |
| --- | --- | --- |
| 0.51 | 23.2 | 24.5 |
| 0.52 | 24.1 | 24.6 |
| 0.54 | 24.5 | 24.9 |
| 0.56 | 24.7 | 25.1 |
| 0.58 | 25.0 | 25.1 |
| 0.60 | 25.2 | 24.9 |
| 0.62 | 25.0 | 24.6 |
| 0.64 | 24.7 | 24.4 |
| 0.65 | 24.6 | 24.1 |
| 0.66 | 24.5 | 23.2 | information area by the optical disk drive A in case the thickness of the substrate 61 of the multilayer optical information medium γ is set to 0.52 mm and the thickness between the surface of the substrate 61 (the outer face of the multilayer optical information medium) and the second planar information area is varied by changing the thickness of the transparent adhesive layer 63.

If the thickness between the surface of the substrate 61 and the second read only type planar information area exceeds 0.68 mm, the signal to noise ratio (S/N) is smaller than 24 dB which is the lowest level at which data can be read out without an error because of increase of noise due to spherical aberration.

TABLE 14

| Thickness between surface of substrate 61 and second read only type planar information area (mm) | S/N in second read only type planar information area (dB) |
| --- | --- |
| 0.55 | 24.6 |
| 0.57 | 24.9 |
| 0.59 | 25.1 |
| 0.61 | 25.1 |
| 0.63 | 24.9 |
| 0.65 | 24.6 |
| 0.67 | 24.4 |
| 0.68 | 24.1 |
| 0.69 | 23.2 |

If the thickness of the transparent adhesive layer 63 of the above-described multilayer optical information medium γ is changed, cross talk between faces of a read out signal from the first read only type information area in the second read only type planar information area is varied as shown in Table 15.

TABLE 15

| Thickness of transparent adhesive layer 63 (μm) | Cross talk between faces (dB) |
| --- | --- |
| 25 | −26 |
| 30 | −30 |
| 35 | −35 |
| 40 | −40 |
| 45 | −46 |

If the transparent adhesive layer 63 is thinner than 30 μm, data cannot be read out without an error because of increase of noise due to increase of cross talk between faces which exceeds −30 dB.

If the thickness of the transparent adhesive layer 63 exceeds 80 μm, a focal level luffing motion in jump between layers is insufficient, servo control is unstable and stable jump between layers cannot be desired. If the thickness of the transparent adhesive layer 63 is 70 μm or less, a focal level luffing motion in jump between layers is stable enough and stable jump between layers can be desired.

If the difference of the reflectance between the first and second read only type planar information areas is 10% or less, stable servo control can be applied without adjustment in jump between the first and second read only type planar information areas, while if the difference exceeds 10%, the gain of a servo is required to be adjusted after jump.

For the semi-reflective layer 62 of the above-described multilayer optical information medium γ, at least three dielectric layers may be laminated and the two layers which are in contact each other may be different in optical constants in place of a $(ZnS)_{80}(SiO_2)_{20}$ layer or a $SiO_2$ layer used in this embodiment. Hereby, the reflectance measured from the side of the substrate with a beam with a wavelength between 400 to 650 nm focused on the first or second read only type planar information area can be kept between 20% and 50%.

Even if the above-described dielectric layer is formed by oxide of any of Ce, La, Si, In, Al, Ge, Pb, Sn, Ta, Sc, Y, T, Zr, V, Nb, Cr and W, sulfide of any of Zn, Ga, In, Sb, Ge, Sn and Pb, fluoride of any of Mg, Ce and Ca, nitride of any of Si, Al, Ta and B, Si or mixture of these, the signal to noise ratio (S/N) in the first or second read only type planar information area is 24 dB or more and data can be read out without an error.

For the reflective layer 64 of the above-described multilayer optical information medium γ, if a metallic layer such as aluminum, an aluminum alloy and a silver alloy is used in place of Ag used in this embodiment, the result similar to that in this embodiment can be also obtained. However, to use aluminum or an aluminum alloy, structure such as an area with high density formed by at least one of oxygen and nitrogen is preferable to be provided in the reflective layer as described above. If the optical disk drive A with a laser beam wavelength of 650 nm and the optical disk drive B with a laser beam wavelength of 532 nm are used when a metallic layer such as gold, a gold alloy, copper and a copper alloy is used, the result similar to that in this embodiment can be obtained, however, if the optical disk drive C with a laser beam wavelength of 415 nm is used, the signal to noise ratio (S/N) in the first or second read only type planar information area is smaller than 24 dB which is the lowest level at which data can be read out without an error because the reflectance of the reflective layer 64 is reduced.

For the transparent adhesive layer 63 of the above-described multilayer optical information medium γ, if a silicone reactive adhesive or an epoxy reactive adhesive is used in place of ultraviolet cured resin used in this embodiment, the result similar to that in this embodiment can be also obtained.

If a polyolefine or PMMA substrate fabricated by injection molding is used in place of the polycarbonate substrate fabricated by injection molding and used in this embodiment or if a substrate provided with an ultraviolet cured resin layer in which information is provided as optical embossed pits on the surface of a glass or resin substrate by photo polymerization is used, the similar result to that in this embodiment can be also obtained.

Thirteenth Embodiment

Figure 14:
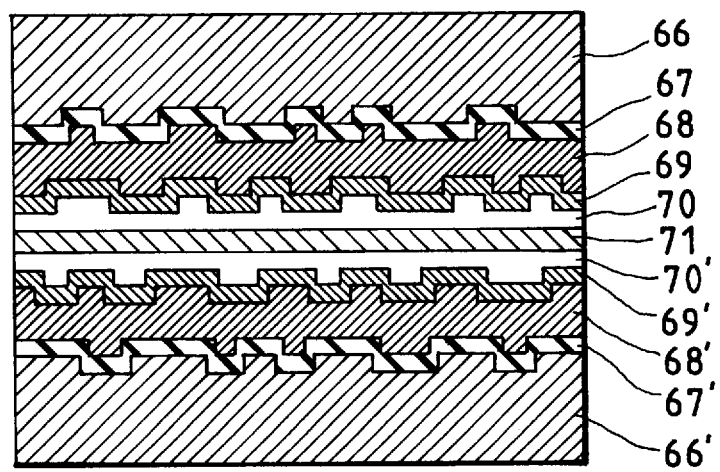
FIG. 14 is a sectional view showing a multilayer optical information medium equivalent to a thirteenth embodiment according to the present invention.

FIG. 14 is an enlarged view showing the section f an optical information medium equivalent to a thirteenth embodiment according to the present invention. A substrate 66 wherein information is formed as optical embossed pits on the surface of a disk-shaped polycarbonate plate 120 mm in diameter and 0.58 mm thick by injection molding is fabricated. A semi-reflective layer 67 consisting of three dielectric layers of a ZnS layer 57 nm thick, a $SiO_2$ layer 85 nm thick and ZnS 57 nm thick is formed on the above-described substrate 66 using argon gas by a radio-frequency magnetron sputtering device to constitute a first read only type planar information area.

Next, using ultraviolet cured resin, an ultraviolet cured resin layer 40 μm thick 68 wherein information is formed as optical embossed pits by photo polymerization for transferring an embossed pit through a stamper is formed. In this case, ultraviolet rays are irradiated through a stamper which is a transparent mold made of plastic from the side of the mold. Thereon, a reflective layer 50 nm thick 69 consisting of gold is formed by sputtering using argon gas to constitute a second read only type planar information area. Further, after an ultraviolet cured resin is deposited 10 μm spinning, ultraviolet rays are irradiated so that the above-described layer is cured and a protective layer 70 is formed to fabricate an optical information medium ξ1.

Similarly, a semi-reflective layer 67', an ultraviolet cured resin layer 68', a reflective layer 69' and a protective layer 70' consisting of ultraviolet cured resin are formed on a substrate 66' to fabricate another optical information medium ξ2 provided with third and fourth read only type planar information areas.

The optical information mediums ξ1 and ξ2 fabricated as described above are stuck together by an adhesive layer 71 so that the substrates 66 and 66' are set outside to fabricate a multilayer optical information medium ξ. In this case, after a silicone reactive adhesive is deposited on the protective layer 70 of the optical information medium ξ1 by 50 μm spinning, the optical information medium ξ2 is stuck on the optical information medium ξ1 in a vacuum so that no bubble enters between the optical information mediums to fabricate a multilayer optical information medium ξ.

Data consisting of embossed pits (pit depth: 80 nm, mark length: 0.44 μm, mark pitch: 0.88 μm, track pitch: 0.74 μm) is read out at the level of light for reading out of 0.5 mW on the surface of the medium from the multilayer optical information medium ξ by rotating the disk at a fixed linear velocity of 3.8 m/sec. by the above-described optical disk drives A, B and C. Data is read out from the first to fourth read only type planar information areas of the above-described each multilayer optical information medium and each signal to noise ratio (S/N) in resolution band width of 30 kHz and in a frequency band of 9 MHz is measured. The reflectance of 30% or more and S/N of 25 dB or more can be obtained from any read only type planar information area and if any of the optical disk drives is used and in any case, data can be read out without an error.

A multilayer optical information medium η provided with fifth and sixth read only type planar information areas is fabricated by setting the thickness of the substrates 66 and 66' of the above-described multilayer optical information medium ξ to 0.56 mm, by forming a semi-reflective layer consisting of three dielectric layers in place of a reflective layer on the ultraviolet cured resin layer 68 and 68' provided in the second read only type planar information area, by forming an ultraviolet cured resin layer 40 μm thick by photo polymerization further on the semi-reflective layer and by forming a reflective layer on the ultraviolet cured resin layer. In this case, for the semi-reflective layer, three dielectric layers consisting of a $Si_3O_4$ layer 65 nm thick, a $SiO_2$ layer 85 nm thick and a $Si_3O_4$ layer 65 nm thick are used. The multilayer optical information medium η is provided with three read only type planar information areas on either side and six areas in total.

When the above-described multilayer optical information medium η is rotated at linear velocity of 3.8 m/sec. by the optical disk drives A, B and C and data consisting of embossed pits (pit depth: 80 nm, mark length: 0.42 μm, mark pitch: 0.88 μm, track pitch: 0.74 μm) is read out at the level of light for reading out of 0.5 mW on the surface of the medium. Data is read out from the first to sixth read only type planar information areas of the above-described each multilayer optical information medium and each signal to noise ratio (S/N) in resolution band width of 30 kHz and in a frequency band of 9 MHz is measured. The reflectance of 30% or more and S/N of 25 dB or more can be obtained from any read only type planar information area and if any of the optical disk drives A, B and C is used, and data can be read out without an error.

Fourteenth Embodiment

A substrate wherein information is formed as optical embossed pits on the surface of a disk-shaped polycarbonate plate 120 mm in diameter and 0.58 mm thick by injection molding is fabricated. A semi-reflective layer consisting of three dielectric layers of a $(ZnS)_{80}(SiO_2)_{20}$ (mole percentage) layer 60 nm thick, a $SiO_2$ layer 85 nm thick and $(ZnS)_{80}(SiO_2)_{20}$ layer 60 nm thick is continuously formed on the above-described substrate by a radio-frequency magnetron sputtering device using argon gas to constitute a first read only planar information area and fabricate an optical information medium θ1.

Next, a replica substrate wherein a spiral U-shaped groove for tracking is formed by injection molding on the surface of the disk-shaped polycarbonate plate 120 mm in diameter and 0.6 mm thick so that the width of the land and groove is respectively 0.74 μm and the depth of the groove is 72 nm is fabricated. First, a reflective layer is formed by depositing Ag by 80 nm on this substrate by a radio-frequency magnetron sputtering device. Further, a first dielectric layer 130 nm thick consisting of $(ZnS)_{80}(SiO_2)_{20}$, a recording layer 25 nm thick consisting of $Ge_{21}Sb_{26}Te_{53}$ in atomic percentage and at last, a second dielectric layer 25 nm thick consisting of $(ZnS)_{80}(SiO_2)_{20}$ are formed in the same sputtering device and as a result, a phase change type recording layer is formed to constitute a second planar information area and fabricate an optical information medium θ2.

The optical information mediums θ1 and θ2 fabricated as described above are stuck together by a transparent adhesive layer consisting of ultraviolet cured resin so that respective substrates are set outside to fabricate a multilayer optical information medium θ. In this case, after ultraviolet cured resin is dropped on the semi-reflective layer of the optical information medium θ1, the optical information medium θ2 is stuck on the optical information medium θ1 so that they are 40 μm thick lest bubbles enter and ultraviolet rays are irradiated from the side of the optical information medium θ1 to cure the resin.

Data is written and read out to/from the multilayer optical information medium θ fabricated as described above by the optical disk drive A used in the twelfth embodiment, the read out data is evaluated, data is read out from the above-described medium by the optical disk drives B and C and the read out data is evaluated. The above-described drive A is used for a normal-density medium for a laser beam with a long wavelength and the drives B and C are used for a high-density medium for a laser beam with a shorter wavelength. Data is read out by rotating the above-described multilayer optical information medium at a fixed linear or angular velocity, by focusing a continuous beam from a semiconductor laser on each planar information area in an arbitrary radius through the substrate of the optical information medium θ1 with an objective lens in the optical head, by automatically focusing, tracking and by detecting the intensity of reflected light.

First, a laser beam is focused on the first read only type planar information area of the multilayer optical information medium θ and the read out data is evaluated using the optical disk drives A, B and C. Data consisting of embossed pits (pit depth: 80 nm, mark length: 0.44 μm, mark pitch: 0.88 μm, track pitch: 0.74 μm) is read out at the level of light for reading out of 1.0 mW on the surface of the medium by rotating the disk at a fixed linear velocity of 3.8 m/sec. Table 16 shows the measured result of the signal to noise ratio (S/N) in resolution band width of 30 kHz and in a frequency band of 9 MHz.

TABLE 16

| Characteristics for reading out of the first read only type planar information area | |
|---|---|
| Drive A | 25.0 dB |
| Drive B | 24.8 dB |
| Drive C | 24.7 dB |

Even if any optical disk drive is used, the signal to noise ratio (S/N) is 24 dB or more and is larger than 24 dB which is the lowest level at which data can be read out without an error.

Next, data is written, erased and read out to/in/from the above-described second planar information area by focusing a laser beam on the above-described second planar information area, by automatically focusing, tracking using the optical disk drive A. A head is driven so that the disk is rotated at a fixed linear velocity of 3.8 m/sec., a continuous beam from a semiconductor laser is kept in an arbitrary radius at a low power level at which recording is not performed and the center of a light spot is always located on the land or groove of the U-shaped guide groove. Storage capacity can be doubled because data is written to both the land and the groove. In this case, recording and erasure are performed concurrently by overwrite by one beam. Overwrite by one beam is performed by changing the power of a laser beam between an intermediate power level (erasure level) which causes crystallization and a high power level (recording level) which causes an amorphous state. It is desirable that the ratio of power between a high power level which causes an amorphous state and an intermediate power level which causes crystallization is in the range of 1 to 0.3 to 1 to 0.8. Hereby, in case overwrite is performed for an area in which data is already recorded, the recorded data is also overwritten and is also replaced with a newly recorded data.

Data is overwritten by setting the level of light for reading out to 1.0 mW in the case of a continuous beam and by changing the power of a laser beam between an intermediate power level which causes crystallization of 7.0 mW and a high power level which causes an amorphous state of 16.0 mW, data is read out by detecting the intensity of reflected light and a read out signal is evaluated. In this case, a signal with the length of a mark of 0.5 μm and a pitch between marks of 1 μm and a signal with the length of a mark of 1.8 μm and a pitch between marks of 3.6 μm are alternately overwritten. If the former signal is overwritten, a read out signal with a carrier to noise ratio of 53.0 dB in resolution band width of 30 kHz and a ratio of erasure of the original signal of 30 dB is outputted. If the latter signal is overwritten, a read out signal with a carrier to noise ratio of 58.0 dB in resolution band width and a ratio of erasure of the original signal of 30 dB is outputted. The erasable frequency until a carrier to noise ratio is reduced up to 1 dB is 0.1 million times or more.

Next, a signal with the length of a mark of 0.5 μm and a pitch between marks of 1 μm recorded in the above-described second planar information area is read out by the optical disk drives A, B and C and is evaluated. Table 17 shows the measured result of a signal to noise ratio (S/N) in resolution band width of 30 kHz and in a frequency band of 9 MHz.

TABLE 17

| Characteristics for reading out of the second planar information area | |
|---|---|
| Drive A | 24.8 dB |
| Drive B | 24.7 dB |
| Drive C | 24.7 dB |

The signal to noise ratio (S/N) is larger than 24 dB which is the lowest level at which data can be read out without an error even if any optical disk drive is used.

For composition of the recording film of the above-described phase change type recording layer, if a group of Ge- Sb-Te other than the above-described ratio of composition, a group of other composition such as a group of Ge-Sb-Te-M (M: metallic element), Ge-Te-Se, Ge-Te-Sb-Se, In-Se, In-Se-Tl, In- Se-M (M: metallic element), In-Sb-Te, InSb-Se, Ga-Sb, Sn-Sb- Se or Sn-Sb-Se-Te is used, the similar result can be also obtained. If a group of In and Sb utilizing phase change between crystals is used in place of a group utilizing phase change between a crystal and an amorphous state, the similar result can be also obtained.

Data is written and read out to/from a multilayer optical information medium c provided with a magneto optical type recording layer with three-layer structure in which a silicon nitride thin film 60 nm thick, a Tb-Fe-Co thin film 20 nm thick and a silicon nitride thin film 15 nm thick are formed in the order on a substrate in place of the second planar information area which is a phase change type recording layer in the above-described multilayer optical information medium θ as the multilayer optical information medium θ by the optical disk drive A and data is read out by the optical disk drives B and C, and the read out data is evaluated.

First, a laser beam is focused on the first read only type planar information area in the above-described multilayer optical information medium c, data is read out by the optical disk drives A, B and C and the read out signal is evaluated. The disk is rotated at a fixed linear velocity of 3.8 m/sec., data consisting of embossed pits (pit depth: 80 nm, mark length: 0.44 μm, mark pitch: 0.88 μm, track pitch: 0.74 μm) is read out at the level of light for reading out of 1.0 mW on the surface of the medium and a signal to noise ratio (S/N) is measured in resolution band width of 30 kHz and in a frequency band of 9 MHz. The result is equal to that in the first read only type planar information area in the above-described multilayer optical information medium θ and the signal to noise ratio (S/N) is larger than 24 dB which is the lowest level at which data can be read out without an error even if any optical disk drive is used.

Next, a laser beam is focused on the second planar information area in the multilayer optical information medium c, a laser beam is irradiated by the optical disk drive A, generating a magnetic field in the direction reverse to that of initial magnetization of the magneto optical layer and data is written to the second planar information area. Data is erased by irradiating a continuous beam, generating a magnetic field in the direction reverse to that of recording. Data is read out by detecting the direction of Kerr rotational angle by differential detection and converting it to the intensity of reflected light. In this case, after a signal with the length of a mark of 0.5 μm and a pitch between marks of 1 μm and a signal with the length of a mark of 1.8 μm and a pitch between marks of 3.6 μm are respectively erased, they are recorded at the level of light for reading out of 1.0 mW in the case of a continuous beam and recording laser beam power of 12 mW. At this time, if the former signal is recorded, a read out signal with a carrier to noise ratio of 53.0 dB in resolution band width of 30 kHz can be obtained. If the latter signal is recorded, a read out signal with a carrier to noise ratio of 58.0 dB in resolution band width of 30 kHz can be obtained. The erasable frequency until the carrier to noise ratio is reduced up to 1 dB is one million times or more.

Next, a signal with the length of a mark of 0.5 μm and a pitch between marks of 1 μm recorded in the second planar information area of the above-described multilayer optical information medium c by the optical disk drive A is read out by the optical disk drives A, B and C and each read out signal is evaluated. Table 18 shows the measured result of the signal to noise ratio (S/N) in resolution band width of 30 kHz and in a frequency band of 9 MHz.

TBALE 18

| Characteristics for reading out of the second planar information area | |
|---|---|
| Drive A | 24.8 dB |
| Drive B | 24.3 dB |
| Drive C | 24.1 dB |

The signal to noise ratio (S/N) is larger than 24 dB which is the lowest level at which data can be read without an error even if any optical disk drive is used.

Data is written and read out to/from a multilayer optical information medium κ provided with a thermic deformation type recording layer which is formed by depositing a cyanic thin film 70 nm thick by spinning application in place of the phase change type recording layer of the above-described multilayer optical information medium θ by the optical disk drive A as the multilayer optical information medium θ, the read out data is evaluated, data is read out by the optical disk drives B and C and the read out data is evaluated.

First, a laser beam is focused on the first read only type planar information area of the above-described multilayer optical information medium κ, data is read out by the optical disk drives A, B and C and the read out data is evaluated. The disk is rotated at a fixed linear velocity of 3.8 m/sec., data consisting of embossed pits (pit depth: 80 nm, mark length: 0.44 μm , mark pitch: 0.88 μm, track pitch: 0.74 μm) is read out at the level of light for reading out of 1.0 mW on the surface of the medium, a signal to noise ratio (S/N) thereof is measured in resolution band width of 30 kHz and in a frequency band of 9 MHz. The result is equal to that of the first planar information area of the above-described multilayer optical information medium—and and the signal to noise ratio (S/N) is larger than 24 dB which is the lowest level at which data can be read out without an error even if any optical disk drive is used.

Next, a laser beam is focused on the second planar information area of the above-described multilayer optical information medium κ, a laser beam is irradiated by the optical disk drive A and data is written. Data is read out by detecting the intensity of reflected light caused by diffraction of light in an area deformed by heat. A signal with the length of a mark of 0.5 μm and a pitch between marks of 1 μm is recorded at the level of light for reading out of 1.0 mW in the case of a continuous beam and recording laser beam power of 14 mW. At this time, a read out signal with a carrier to noise ratio of 53.0 dB in resolution band width of 30 kHz can be obtained.

Next, a signal with the length of a mark of 0.5 μm and a pitch between marks of 1 μm recorded in the second planar information area of the above-described multilayer optical medium κ by the optical disk drive A is read out by the optical disk drives A, B and C and the read out signal is evaluated. Table 19 shows the measured result of a signal to noise ratio thereof (S/N) in resolution band width of 30 kHz and in a frequency band of 9 MHz.

TABLE 19

| Characteristics for reading out in the second planar information area | |
|---|---|
| Drive A | 24.9 dB |
| Drive B | 24.3 dB |
| Drive C | 24.1 dB |

The signal to noise ratio (S/N) is larger than 24 dB which is the lowest level at which data can be read out without an error even if any optical disk drive is used.

If at least one of phthalocyanine, polymethylene, naphthoquinone, rhodamine, azulene, large ring azaannulene is used as a main component in place of cyanine used for the thermic deformation type recording layer of the multilayer optical information medium κ, the similar result can be also obtained.

Fifteenth Embodiment

An optical information medium wherein an ultraviolet cured resin layer in which a U-shaped guide groove for tracking with a pitch between tracks of 1.48 μm which is both 0.74 μm in the width of a land and a groove thereof and a prepit in which address information is stored are formed is respectively formed in place of the ultraviolet cured resin layers 68 and 68' of the optical information mediums ξ1 and ξ2 in the thirteenth embodiment shown in FIG. 14 and a recording layer and a reflective layer are respectively formed in place of the reflective layers 69 and 69' is fabricated. First, as a phase change type recording layer, a (ZnS)80(SiO₂)20 thin film 130 nm thick, a Ge₂₁Sb₂₅Te₅₄ thin film 25 nm thick and a (ZnS)₈₀(SiO₂)₂₀ thin film 25 nm thick are formed in order from the side of a substrate, next as a reflective layer, an Ag thin film 70 nm thick is formed to fabricate optical information mediums λ1 and λ2. These optical information mediums λ1 and μ2 are stuck together as in the thirteenth embodiment to fabricate a multilayer optical information medium λ.

Similarly, as a magneto optical type recording layer, a silicon nitride thin film 60 nm thick, a Tb-Fe-Co thin film 20 nm thick and a silicon nitride thin film 15 nm thick are formed in order from the side of the substrate and further, as a reflective layer, an Ag thin film 50 nm thick is formed to fabricate optical information mediums μ1 and μ2. These optical information mediums μ1 and μ2 are similarly stuck together to fabricate a multilayer optical information medium μ.

Further, similarly, as a thermic deformation type recording layer, a phthalocyanine thin film 60 nm thick is formed and further, as a reflective layer, an Ag thin film 70 nm thick is formed to fabricate optical information mediums v1 and v2. These optical information mediums v1 and v2 are similarly stuck together to fabricate a multilayer optical information medium v.

Data is written to the multilayer optical information mediums λ, μ and v fabricated as described above by the optical disk drive A, data is read out from them by the optical disk drives A, B and C and each read out data is evaluated. The above-described optical disk drive A is used for a normal-density medium for a laser beam with a long wavelength and the optical disk drives B and C are used for a high-density medium for a laser beam with a shorter wavelength.

Data is read out by rotating the above-described multilayer optical information mediums λ, μ and v at a fixed linear velocity of 3.8 m/sec., by focusing a continuous beam from a semiconductor laser on the first and second read only type planar information areas in an arbitrary radius with an objective lens in an optical head through respective substrates, by focusing automatically, tracking and by detecting the intensity of reflected light. Data consisting of embossed pits (pit depth: 80 nm, mark length: 0.44 μm, mark pitch: 0.88 μm, track pitch: 0.74 μm) is read out at the level of light for reading out of 1.0 mW on the surface of the disk and a signal to noise ratio thereof (S/N) is measured in resolution band width of 30 kHz and in a frequency band of 9 MHz. The reflectance of 15% or more and S/N of 24.7 dB or more can be obtained in the read only type planar information area of any multilayer optical information medium if any of the optical disk drives A, B and C is used and data can be read out without an error.

Next, data is written to respective recording layer of the above-described multilayer optical information mediums λ, μ and v, by focusing a laser beam on the above-described recording layer and by focusing automatically with the optical disk drive A, tracking. A head is driven so that the disk is rotated at a fixed linear velocity of 3.8 m/sec., a continuous beam from a semiconductor laser is kept at a low power level at which recording is not performed in an arbitrary radius and the center of a light spot is always located in the land or the groove of the U-shaped guide groove. As data is recorded in both the land and the groove, storage capacity can be doubled.

Data is overwritten in the multilayer optical information medium λ by setting the level of light for reading out to 1.0 mW in the case of a continuous beam and by changing the power of a laser beam between an intermediate power level of 7.0 mW at which crystallization is caused and a high power level of 16.0 mW at which an amorphous state is caused by the optical disk drive A, data is read out by detecting the intensity of reflected light and the read out signal is evaluated. In this case, a signal with the length of a mark of 0.5 μm and a pitch between marks of 1 μm and a signal with the length of a mark of 1.8 μm and a pitch between marks of 3.6 μm are alternately overwritten. If the former signal is overwritten, a signal with a carrier to noise ratio of 53.0 dB in resolution band width of 30 kHz and a ratio of erasure of the original signal of 30 dB is read out. If the latter signal is overwritten, a signal with a carrier to noise ratio of 58.0 dB in resolution band width of 30 kHz and a ratio of erasure of the original signal of 30 dB is read out. The erasable frequency until the carrier to noise ration at this time is reduced up to 1 dB is 0.1 million times or more.

Next, the signal with the length of a mark of 0.5 μm and a pitch between marks of 1 μm recorded by the optical disk drive A as described above is read out by the optical disk drives A, B and C and the read out signal is evaluated. A signal to noise ratio thereof (S/N) is measured in resolution band width of 30 kHz and in a frequency band of 9 MHz. The reflectance of 15% or more and S/N of 24.7 dB or more can be obtained in any recording layers and even if any of the optical disk drives A, B and C is used and data can be read out without an error.

Data is written to the multilayer optical information medium μ by irradiating a laser beam, generating a magnetic field in the direction reverse to that of the initial magnetization of a magneto optical layer by the optical disk drive A. Data is erased by irradiating a continuous beam, generating a magnetic field in the direction reverse to that of recording. Data is read out by detecting the direction of Kerr rotational angle by differential detection and by converting it to the intensity of reflected light. In this case, after a signal with the length of a mark of 0.5 μm and a pitch between marks of 1 μm and a signal with the length of a mark of 1.8 μm and a pitch between marks of 3.6 μm are respectively erased, they are recorded at the level of light for reading out of 1.0 mW in the case of a continuous beam and recording laser beam power of 12 mW. If the former signal is recorded, a read out signal with a carrier to noise ratio of 53.0 dB in resolution band width of 30 kHz can be obtained. If the latter signal is recorded, a read out signal with a carrier to noise ratio of 58.0 dB in resolution band width of 30 kHz can be obtained. The erasable frequency until the carrier to noise ratio at this time is reduced up to 1 dB is one million times or more.

Next, the signal with the length of a mark of 0.5 μm and a pitch between marks of 1 μm recorded by the optical disk drive A as described above is read out by the optical disk drives A, B and C and the read out signal is evaluated. A signal to noise ratio thereof (S/N) is measured in resolution band width of 30 kHz and in a frequency band of 9 MHz. The reflectance of 15% or more and S/N of 24.1 dB or more can be obtained in any recording layer and even if any of the optical disk drives A, B and C is used and data can be read out without an error.

Data is written to the multilayer optical information medium v by the optical disk drive A by irradiating a laser beam. Data is read out by detecting the intensity of reflected light caused by diffraction of light for reading out in an area deformed by heat. If a signal with the length of a mark of 0.5 μm and a pitch between marks of 1 μm is recorded, a read out signal with a carrier to noise ratio of 53.0 dB in resolution band width of 30 kHz can be obtained at the level of light for reading out of 1.0 mW in the case of a continuous beam and recording laser beam power of 14 mW.

Next, data is read out by the optical disk drives A, B and C as described above and each read data is evaluated. A signal to noise ratio thereof (S/N) is measured in resolution band width of 30 kHz and in a frequency band of 9 MHz. The reflectance of 15% or more and S/N of 24.1 dB or more can be obtained in any recording layer and even if any of the optical disk drives A, B and C is used and data can be read out without an error.

What is claimed is:

1. A multilayer optical information medium, comprising
    a first optical information medium provided with two to four layers of planar information areas on a first substrate;
    a second optical information medium provided with two to four layers of planar information areas on a second substrate,
    wherein at least one of said planar information areas comprises embossed pits provided on a layer formed by material which transmits a light spot for reading out information respectively provided on said first and second substrates, and a semi-reflective film provided on said embossed pits; and
    structure in which said first and second substrates are respectively arranged outside, wherein:
    the thickness of said first and second substrates is both between 0.52 mm and 0.65 mm, the thickness of said layer which transmits a light spot is in the range of 30 to 80 μm, and the first and second optical information media are positioned such that information of the first optical information medium is read out through the first substrate, and information of the second optical information medium is read out through the second substrate.

2. A multilayer optical information medium according to claim 1, wherein:
    said planar information area respectively arranged closest to said first and second substrates, comprising
    embossed pits provided on the surface of respective substrate; and
    a semi-reflective film provided on said embossed pits.

3. A multilayer optical information medium according to claim 1, wherein:
    said semi-reflective layer is formed by at least one of aluminum, an aluminum alloy, gold, a gold alloy, silver, a silver alloy, copper and a copper alloy.

4. A multilayer optical information medium according to claim 1, wherein:
    said semi-reflective layer is formed by at least one of silicon, germanium, silicon oxide, germanium oxide, silicon nitride, germanium nitride, aluminum nitride and zinc sulfide.

5. A multilayer optical information medium according to claim 1, wherein:
    said first and second planar information areas respectively arranged in the farthest position from respective substrates of said planar information areas provided on said first and second optical information mediums, respectively comprising
    embossed pits provided on said layer formed by material which transmits a light spot for reading out information; and
    a reflective layer provided on said embossed pits.

6. A multilayer optical information medium according to claim 5, wherein:
    the thickness of said reflective layer is in the range of 30 to 60 μm.

7. A multilayer optical information medium according to claim 5, wherein:
    planar information areas other than said first and second planar information areas of said planar information areas are provided with a semi-reflective layer; and
    the reflectance measured from the side of respective substrates of said semi-reflective layer and the reflective layer of said first and second planar information areas is in the range of 10 to 50%.

8. A multilayer optical information medium according to claim 7, wherein:

the difference between respective values of the reflectance is in the range of ±10%.

9. A multilayer optical information medium according to claim 1, wherein:

the first and second planar information areas arranged in the farthest position from respective substrates of said planar information areas provided on said first and second optical information mediums, respectively comprising a recording layer; and a reflective layer provided on said recording layer.

10. A multilayer optical information medium according to claim 9, wherein;

said recording layer is one of a phase change recording layer, a magneto optical recording layer and a thermic deformation recording layer.

11. A multilayer optical information medium according to claim 9, wherein:

planar information areas other than said first and second planar information areas of said planar information areas are provided with a semi-reflective layer; and the reflectance measured from the side of respective substrates of said semi-reflective layer and the reflective layer of said first and second planar information areas is in the range of 10 to 50%.

12. A multilayer optical information medium according to claim 11, wherein:

the difference between respective values of the reflectance is in the range of ±10%.

13. A multilayer optical information medium according to claim 1, wherein:

two planar information areas are respectively provided on said first and second optical information mediums.

14. A multilayer optical information medium according to claim 1, wherein:

three planar information areas are respectively provided on said first and second optical information mediums; and the thickness of said first and second substrates is respectively between 0.52 mm and 0.62 mm.

15. A multilayer optical information medium according to claim 1, wherein:

four planar information areas are respectively provided on said first and second optical information mediums; and the thickness of said first and second substrates is respectively between 0.52 mm and 0.59 mm.

16. A multilayer optical information medium according to claim 1, wherein:

an adhesive layer is provided between said first and second optical information mediums.

17. An optical information medium, wherein:

in an optical information medium at least provided with a reflective layer for reflecting a light spot for reading out, said reflective layer is provided with an area in which the density of nitrogen is high in the direction of the thickness thereof.

18. An optical information medium according to claim 17, wherein:

said reflective layer is formed by at least one of aluminum and an aluminum alloy.

19. An optical information medium according to claim 17, wherein:

said reflective layer is formed by an aluminum alloy; and the average composition of said aluminum alloy is shown by a general expression $(Al)_{100-x}(A)_x$, wherein x: atomic percentage in the range of $0.1 \leq x \leq 30$, and wherein A: at least one of Si, Sc, Ti, V, Cr, Mn, Fe, Co, Ni, Zn, Ga, Ge, Y, Zr, Nb, Mo, Ru, Rh, Pd, Cd, In, Sn, Sb, Te, La, Hf, Ta, W, Re, Os, Ir, Pt, Tl, Pb, Bi, Au, Ag and Cu.

20. An optical information medium according to claim 19, wherein:

said "x" denotes an atomic percentage in the range of $0.5 \leq x \leq 15$.

21. An optical information medium according to claim 19, wherein:

an element shown by said "A" is Ti.

22. An optical information medium according to claim 19, wherein:

an element shown by said "A" is Zr.

23. An optical information medium according to claim 19, wherein:

an element shown by said "A" is Hf.

24. An optical information medium according to claim 17, wherein:

the thickness of said reflective layer is in the range of 20 to 500 nm.

25. An optical information medium, wherein:

in an optical information medium at least provided with a reflective layer for reflecting a light spot for reading out, said reflective layer consists of at least two metallic layers; and an intermediate layer formed by a compound consisting of a nitride is provided between each two metallic layers.

26. An optical information medium according to claim 25, wherein:

said at least two metallic layers are formed by at least one of aluminum and an aluminum alloy.

27. An optical information medium according to claim 25, wherein:

said at least two metallic layers are formed by an aluminum alloy; and the average composition of said aluminum alloy is shown by a general expression $(Al)_{100-x}(A)_x$, wherein x: atomic percentage in the range of $0.1 \leq x \leq 30$, and wherein A: at least one of Si, Sc, Ti, V, Cr, Mn, Fe, Co, Ni, Zn, Ga, Ge, Y, Zr, Nb, Mo, Ru, Rh, Pd, Cd, In, Sn, Sb, Te, La, Hf, Ta, W, Re, Os, Ir, Pt, Tl, Pb, Bi, Au, Ag and Cu.

28. An optical information medium according to claim 27, wherein:

said "x" denotes an atomic percentage in the range of $0.5 \leq x \leq 15$.

29. An optical information medium according to claim 27, wherein:

an element shown by said "A" is Ti.

30. An optical information medium according to claim 27, wherein:

an element shown by said "A" is Zr.

31. An optical information medium according to claim 27, wherein:

an element shown by said "A" is Hf.

32. An optical information medium according to claim 25, wherein:

the thickness of said reflective layer is in the range of 20 to 500 nm.

33. An optical information medium according to claim 25, wherein:

the at least two metallic layers are made of a same metal, and said compound is a nitride of said metal.

34. An optical information medium according to claim 33, wherein said metal is aluminum or an alloy thereof.

35. A multilayer optical information medium, comprising
a first optical information medium provided with two to four layers of planar information areas on a first substrate;
a second optical information medium provided with two to four layers of planar information areas on a second substrate; and
structure in which said first and second substrates are respectively arranged outside, wherein:
the thickness of said first and second substrates is respectively between 0.52 mm and 0.65 mm;
said first and second planar information areas arranged in the farthest position from respective substrates of said planar information areas on said first and second substrates are respectively constituted by embossed pits provided on the surface of a layer formed by material which transmits a light spot for reading out information and a reflective layer provided on said embossed pits; and
said reflective layer is provided with an area in which the density of nitrogen is high in the direction of the thickness thereof.

36. A multilayer optical information medium according to claim 35, wherein:
said reflective layer is formed by at least one of aluminum and an aluminum alloy.

37. A multilayer optical information medium according to claim 35, wherein:
said planar information area respectively arranged in the closest position to said first and second substrates, comprising
embossed pits provided on the surface of respective substrates; and
a semi-reflective layer provided on said embossed pits.

38. A multilayer optical information medium, comprising
a first optical information medium provided with two to four layers of planar information areas on a first substrate;
a second optical information medium provided with two to four layers of planar information areas on a second substrate; and
structure in which said first and second substrates are respectively arranged outside, wherein:
the thickness of said first and second substrates is respectively between 0.52 mm and 0.65 mm;
said first and second planar information areas arranged in the farthest position from respective substrates of said planar information areas on said first and second substrates are respectively constituted by a recording layer and a reflective layer provided on said recording layer;
said reflective layer consists of at least two metallic layers; and
an intermediate layer formed by a compound consisting of a nitride is provided between each two metallic layers.

39. An optical information medium according to claim 38, wherein:
said at least two metallic layers are formed by at least one of aluminum and an aluminum alloy.

40. A multilayer optical information medium according to claim 38, wherein:
said recording layer is one of a phase change recording layer, a magneto optical recording layer and a thermic deformation recording layer.

41. A multilayer optical information medium according to claim 38, wherein:
said planar information area respectively arranged in the closest position to said first and second substrates, comprising
embossed pits provided on the surface of respective substrates; and
a semi-reflective layer provided on said embossed pits.

42. An optical information medium according to claim 38, wherein:
the at least two metallic layers are made of a same metal, and said compound is a nitride of said metal.

43. An optical information medium according to claim 42, wherein said metal is aluminum or an alloy thereof.

44. A multilayer optical information medium, wherein:
first and second planar information areas for reading out information by a focused light beam are arranged between first and second substrates arranged opposite;
said first planar information area arranged on the side of said first substrate on which said light beam is incident is constituted by embossed pits provided on the surface of said first substrate and a semi-reflective layer provided on said embossed pits;
said second planar information area arranged on the side of said second substrate is constituted by embossed pits provided on the surface of a layer formed by material which transmits said light beam and a reflective layer provided on said embossed pits;
the thickness of said first substrate is between 0.52 mm and 0.65 mm;
said layer formed by material which transmits said light beam having a thickness in the range of 30 to 80 μm;
said semi-reflective layer consists of at least three dielectric layers; and
two dielectric layers which are in contact with each other are different in optical constants.

45. A multilayer optical information medium, wherein:
in said multilayer optical information medium according to claim 44, the distance between the surface of said first substrate on the side reverse to said second substrate and the surface of said reflective layer on the side of said second substrate is in the range of 0.55 to 0.68 mm.

46. A multilayer optical information medium, wherein:
in said multilayer optical information medium according to claim 42, said semi-reflective layer is formed by at least one of Si, an oxide of Ce, La, Si, In, Al, Ge, Pb, Sn, Ta, Sc, Y, Ti, Zr, V, Nb, Cr and W, a sulfide of Zn, Ga, In, Sb, Ge, Sn and Pb, a fluoride of Mg, Ce and Ca and a nitride of Si, Al, Ta and B.

47. A multilayer optical information medium, wherein:
in said multilayer optical information medium according to claim 44, the reflectance measured from the side of said first substrate of said semi-reflective layer and reflective layer is respectively in the range of 10 to 50%.

48. A multilayer optical information medium, wherein:

in said multilayer optical information medium according to claim 47, the difference between respective values of said reflectance is in the range of ±10%.

49. A multilayer optical information medium, comprising a first optical information medium provided with two to four layers of planar information areas on a first substrate;

a second optical information medium provided with two to four layers of planar information areas on a second substrate; and structure in which said first and second substrates are respectively arranged outside, wherein:

the thickness of said first and second substrates is respectively between 0.52 mm and 0.65 mm;

the first and second optical information media are positioned such that information of the first optical information medium is read out through the first substrate, and information of the second optical information medium is read out through the second substrate;

first and second planar information areas arranged in the farthest position from respective substrates of said planar information areas on said first and second substrates are respectively constituted by embossed pits provided on the surface of a layer formed by material which transmits a light beam for reading out information and a reflective layer provided on said embossed pits;

a planar information area other than said first and second planar information areas is constituted by embossed pits provided on the surface of at least one of said substrate and said layer formed by material which transmits said light beam and a semi-reflective layer provided on said embossed pits;

said layer formed by material which transmits said light beam having a thickness in a range of 30 to 80 μm;

said semi-reflective layer consists of at least three dielectric layers; and two dielectric layers which are in contact with each other are different in optical constants.

50. A multilayer optical information medium according to claim 49, wherein:

said planar information area respectively arranged in the closest position to said first and second substrates, comprising embossed pits provided on the surface of respective substrates; and a semi-reflective layer provided on said embossed pits.

51. A multilayer optical information medium, wherein:

in said multilayer optical information medium according to claim 49, the distance between the surface of said first substrate on the side reverse to said second substrate and the surface of said reflective layer provided on said first substrate on the side of said first substrate is in the range of 0.55 to 0.68 mm; and the distance between the surface of said second substrate on the side reverse to said first substrate and the surface of said reflective layer provided on said second substrate on the side of said second substrate is in the range of 0.55 to 0.68 mm.

52. A multilayer optical information medium according to claim 49, wherein:

the reflectance measured from the side of respective substrates of said semi-reflective layer and said reflective layer provided on said first and second substrates is respectively in the range of 10 to 50%.

53. A multilayer optical information medium according to claim 52, wherein:

the difference between respective values of said reflectance is in the range of ±10%.

54. A multilayer optical information medium, wherein:

in said multilayer optical information medium according to claim 49, the thickness of said layer formed by transparent material is in the range of 30 to 60 μm.

55. A multilayer optical information medium, wherein:

in said multilayer optical information medium according to claim 49, said semi-reflective layer is formed by at least one of Si, an oxide of Ce, La, Si, In, Al, Ge, Pb, Sn, Ta, Sc, Y, Ti, Zr, V, Nb, Cr and W, a sulfide of Zn, Ga, In, Sb, Ge, Sn and Pb, a fluoride of Mg, Ce and Ca and a nitride of Si, Al, Ta and B.

56. A multilayer optical information medium, comprising a first optical information medium provided with two to four layers of planar information areas on a first substrate;

a second optical information medium provided with two to four layers of planar information areas on a second substrate; and structure in which said first and second substrates are respectively arranged outside, wherein:

the thickness of said first and second substrates is respectively between 0.52 mm and 0.65 mm;

first and second planar information areas arranged in the farthest position from respective substrates of said planar information areas on said first and second substrates are respectively constituted by a recording layer and a reflective layer provided on said recording layer;

a planar information area other than said first and second planar information areas is constituted by embossed pits provided on the surface of at least one of said substrate and a layer formed by material which transmits a light beam for reading out information and a semi-reflective layer provided on said embossed pits;

the first and second optical information media are positioned such that information of the first optical information medium is read out through the first substrate, and information of the second optical information medium is read out through the second substrate;

said first and second optical information mediums respectively consist of three layers of said planar information areas;

said planar information area respectively arranged in the closest position to said first and second substrates consists of embossed pits provided on the surface of respective substrates and a semi-reflective film provided on said embossed pits;

said planar information area respectively arranged in the second closest position to said first and second substrates consists of embossed pits provided on the surface of the layer formed by material which transmits said light beam and a semi-reflective film provided on said embossed pits; and the thickness of said layer formed by material which transmits a light beam is in the range of 30 to 80 μm;

said semi-reflective layer consists of at least three dielectric layers; and two dielectric layers which are in contact with each other are different in optical constants.

57. A multilayer optical information medium according to claim 56, wherein:

said recording layer is one of a phase change recording layer, a magneto optical recording layer and a thermic deformation recording layer.

58. A multilayer optical information medium according to claim 56, wherein:

said planar information area respectively arranged in the closest position to said first and second substrates, comprising embossed pits provided on the surface of respective substrates; and a semi-reflective layer provided on said embossed pits.

59. A multilayer optical information medium, wherein:

in said multilayer optical information medium according to claim 56, the distance between the surface of said first substrate on the side reverse to said second substrate and the surface of said reflective layer provided on said first substrate on the side of said first substrate is in the range of 0.55 to 0.68 mm; and the distance between the surface of said second substrate on the side reverse to said first substrate and the surface of said reflective layer provided on said second substrate on the side of said second substrate is in the range of 0.55 to 0.68 mm.

60. A multilayer optical information medium according to claim 59, wherein:

the reflectance measured from the side of respective substrates of said semi-reflective layer and said reflective layer provided on said first and second substrates is respectively in the range of 10 to 50%.

61. A multilayer optical information medium according to claim 60, wherein:

the difference between respective values of said reflectance is in the range of ±10%.

62. A multilayer optical information medium, wherein:

in said multilayer optical information medium according to claim 56, said first and second optical information mediums respectively consist of four layers of said planar information areas;

said planar information area respectively arranged in the closest position to said first and second substrates consists of embossed pits provided on the surface of respective substrates and a semi-reflective film provided on said embossed pits;

said planar information areas respectively arranged in the second and third closest position to said first and second substrates consist of embossed pits provided on the surface of a layer formed by material which transmits said light beam and a semi-reflective film provided on said embossed pits; and the thickness of said layer formed by material which transmits a light beam is in the range of 30 to 80 $\mu$m.

63. A multilayer optical information medium, wherein:

in said multilayer optical information medium according to claim 56, said semi-reflective layer is formed by at least one of Si, an oxide of Ce, La, Si, In, Al, Ge, Pb, Sn, Ta, Sc, Y, Ti, Zr, V, Nb, Cr and W, a sulfide of Zn, Ga, In, Sb, Ge, Sn and Pb, a fluoride of Mg, Ce and Ca and a nitride of Si, Al, Ta and B.

64. A multilayer optical information medium, wherein:

first and second planar information areas are arranged between first and second substrates arranged opposite;

said first planar information area arranged on the side of said first substrate on which a light spot for recording and reading out information is incident is constituted by embossed pits provided on the surface of said first substrate and a semi-reflective layer provided on said embossed pits;

said second planar information area arranged on the side of said second substrate is constituted by a recording layer and a reflective layer provided on the side reverse to the side of said recording layer on which a light beam is incident; and a layer of material, which transmits said light beam, is located between said first and second planar information areas, a thickness of said layer of material which transmits said light beam being in the range of 30 to 80 $\mu$m;

the thickness of said first substrate is between 0.52 mm and 0.65 mm;

said semi-reflective layer consists of at least three dielectric layers; and two dielectric layers which are in contact with each other are different in optical constants.

65. A multilayer optical information medium, wherein:

in said multilayer optical information medium according to claim 64, the distance between the surface of said first substrate on the side reverse to said second substrate and the surface of said reflective layer on the side of said second substrate is in the range of 0.55 to 0.68 mm.

66. A multilayer optical information medium, wherein:

in said multilayer optical information medium according to claim 64, said semi-reflective layer is formed by at least one of Si, an oxide of Ce, La, Si, In, Al, Ge, Pb, Sn, Ta, Sc, Y, Ti, Zr, V, Nb, Cr and W, a sulfide of Zn, Ga, In, Sb, Ge, Sn and Pb, a fluoride of Mg, Ce and Ca and a nitride of Si, Al, Ta and B.

67. A multilayer optical information medium, wherein:

in said multilayer optical information medium according to claim 64, the reflectance measured from the side of said first substrate of said semi-reflective layer and reflective layer is respectively in the range of 10 to 50%.

68. A multilayer optical information medium, wherein:

in said multilayer optical information medium according to claim 67, the difference between respective values of said reflectance is in the range of ±10%.

69. A multilayer optical information medium according to claim 64, wherein:

said recording layer is one of a phase change recording layer, a magneto optical recording layer and a thermic deformation recording layer.

* * * * *